United States Patent [19]

Dobbins, III

[11] Patent Number: 4,903,204

[45] Date of Patent: Feb. 20, 1990

[54] MATRIX INVERSION TOMOSYNTHESIS IMPROVEMENTS IN LONGITUDINAL X-RAY SLICE IMAGING

[75] Inventor: James T. Dobbins, III, Durham, N.C.

[73] Assignee: Duke University, Durham, N.C.

[21] Appl. No.: 126,793

[22] Filed: Dec. 1, 1987

[51] Int. Cl.⁴ ............................................. G06F 15/42
[52] U.S. Cl. ........................... 364/413.24; 364/413.13; 378/901
[58] Field of Search .............. 364/414, 413.13, 413.21; 378/901

[56] References Cited

U.S. PATENT DOCUMENTS 3,499,146  3/1970  Richards .
4,147,936  4/1979  Eickel .
4,506,327  3/1985  Tam .
4,598,369  7/1986  Wang et al. .

OTHER PUBLICATIONS

IEEE Transactions on Nuclear Sci., vol. NS-23, No. 1, Feb. 1976, "Axial Tomography and Three Dimensional Image Reconstruction", L. T. Chang, B. Macdonald & V. Perez—Mendez, pp. 568-572.

Phys. Med. Biol. 1978, vol. 23, No. 2, 235-244, "Object Reconstruction from Focused Positron Tomograms," D. Townsend, C. Piney & A. Jeavons.

"Tomosynthesis: A Three—Dimensional Radiographic Imaging Technique", David G. Grant, IEEE Transactions on Biomedical Engineering, vol., BMF-19, No. 1, Jan. 1972, pp. 20-28.

"Selective Plane Removal in Limited Angle Tomographic Imaging", D. N. Ghosh, Roy, R. A. Kruger, B. Yih, & P. Del Rio, Med. Phys. 12(1) Jan./Feb. 1985, pp. 65-70.

IEEE Transactions on Biomedical Engineering, vol. BME-27, No. 11, May 1980, "Ectomography—A New Radiographic Reconstruction Method—1, Theory and Error Estimates", Hans E. Knutsson, Paul Edholm, Goesta H. Granlund, & Christer U. Petersson, pp. 640-648.

IEEE Trans. on Nuclear Sci., vol. NS-25, Feb. 1978, "Three Dimensional in Planar Positron Cameras Using Fourier Deconvolution of Generalized Tomographs", (List continued on next page.)

Primary Examiner—Jerry Smith
Assistant Examiner—Gail O. Hughes
Attorney, Agent, or Firm—Cushman, Darby & Cushman

[57] ABSTRACT

The present invention describes improvements to digital tomosynethesis, whereby a plurality of x-ray projection images are shifted and summed to form a matrix of tomographs at variable plane heights. Prior to tomosynthesis, the projection images are weighted by a weighting function which falls off towards shallower angles of the x-ray tube during acquisition, in order to improve the reconstructability of between-plane structures. A matrix of blurring functions is then determined, describing the blurring of structures in all planes for every tomosynthesis reconstruction. Actual patient structures are then reconstructed by solving a matrix equation containing the matrix of tomosynthesized images and the matrix of blurring functions. The patient structure images are then improved by a hybrid correction routine which combines low spatial frequencies from a wide swing of the x-ray source with high and mid spatial frequencies from a narrow swing of the x-ray source. The data, once hybrid corrected, is further corrected using an interative technique to improve the reconstruction of low spatial frequencies. This iterative technique corrects each column of each image by sequentially determining if errant frequency components are present at the edge of the images where the patient is not present. If errant frequency components are found, they are subtracted from the entire image column. Lastly, a DC level correction is performed which corrects for errant zero frequency components by adding a constant value to each image column to force the edge of each image to zero. The data is finally displayed on a display monitor. An interleaving technique is used to vary reconstructed plane heights in order to permit improved interplane resolution.

94 Claims, 10 Drawing Sheets

OTHER PUBLICATIONS

K. S. Tam, G. Chu. V. Perez—Mendez and C. B. Lim, Lawrence Berkeley Laboratory, pp. 152-159.
"Three—Dimensional Imaging in the Positron Camera Using Fourier Techniques", pp. 245-265, Gilbert Chu & Kwok—Cheong Tam.
"Theory of Imaging with a Very Limited Number of Projections", Jorge Llacer, pp. 596-602.
"Tomographic Image Reconstruction by Eigenvector Decomposition: Its Limitations and Areas of Applicability", Jorge Llacer, pp. 34-42.
H. H. Barrett & W. Swindell, Radiological Imaging, vol. 2, Academic Press, New York, 1981, pp. 549-553.
"Three Dimensional Image Reconstruction with Large—Area Positron Cameras", Digest of the 4th International Conf. on Med. Physics, Ottawa, Canada, 1976, (one page).
"Visual Simulation and Image Realism II", K. S. L. Setty, Scientific Library, Aug. 27-28, 1981, pp. 52-66.

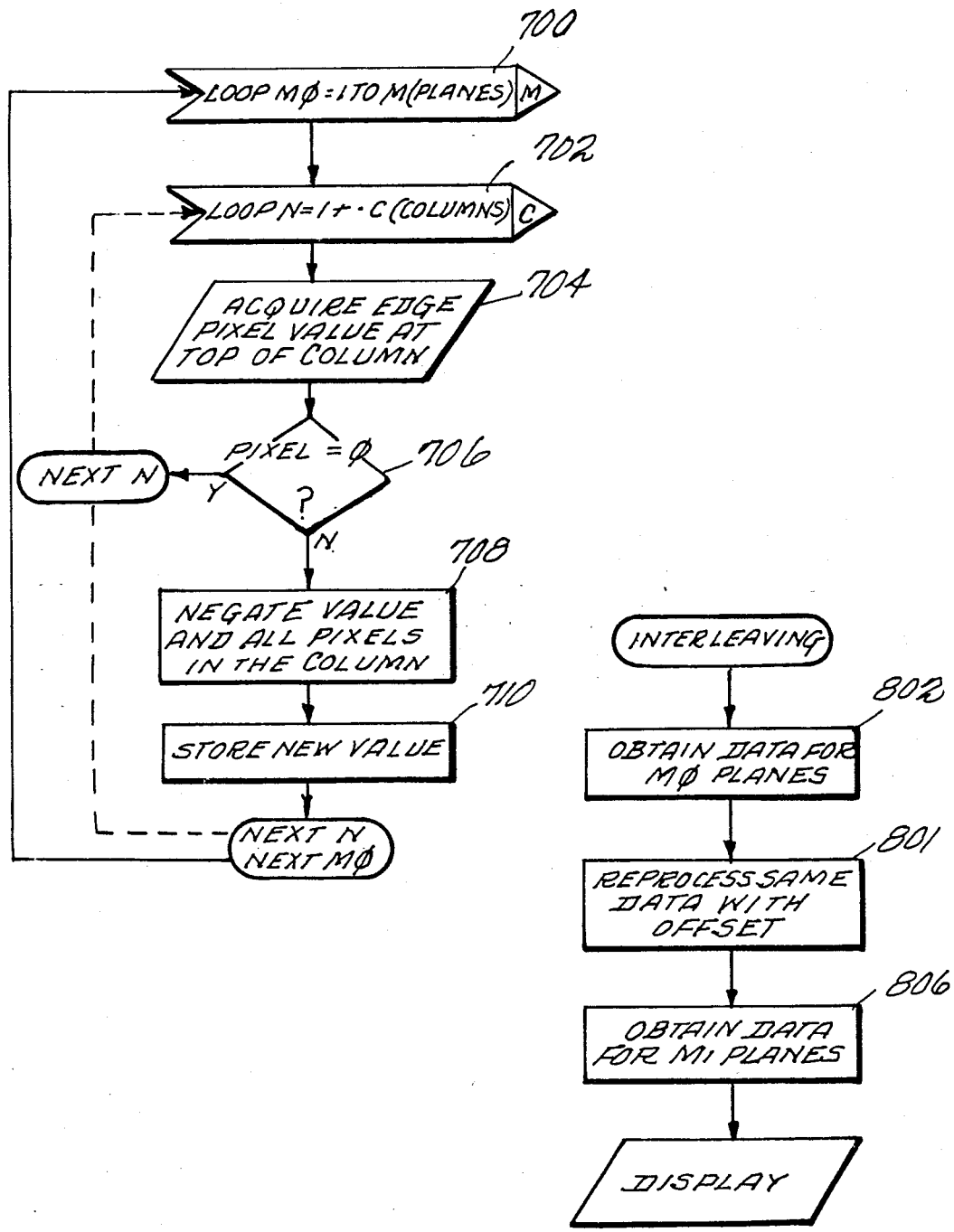

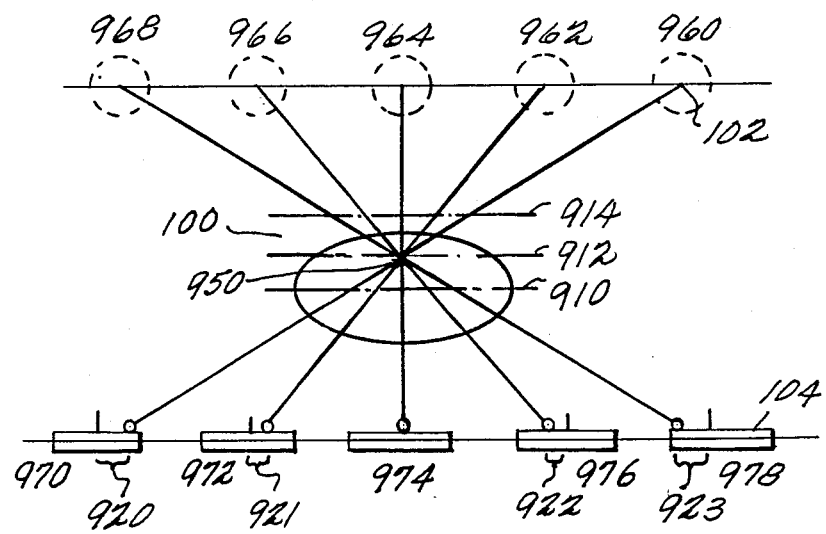
FIG. 9A
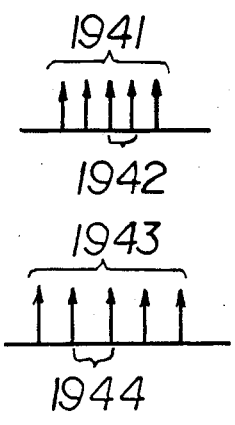
FIG. 9B
FIG. 9C
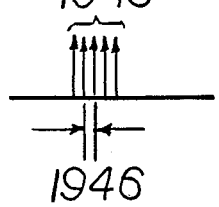
FIG. 9D

MATRIX INVERSION TOMOSYNTHESIS IMPROVEMENTS IN LONGITUDINAL X-RAY SLICE IMAGING

BACKGROUND AND SUMMARY OF THE INVENTION

The present invention relates to the field of radiological imaging, and particularly to an improvement in digital x-ray tomosynthesis. More specifically, the present invention describes a number of improvement algorithms which are used in combination with matrix inversion mathematics and digital tomosynthesis in order to allow improved longitudinal slice images of a patient to be obtained.

One of the main functions of the science of radiology is the visualizing of structures internal to the patient. Historically, the visualizing of patient structures has most commonly employed projection imaging techniques, whereby all structures in the area of interest in the patient are displayed superimposed on a single sheet of film. It is sometimes difficult, however, to visualize adequately the anatomy of interest in a projection image due to the complex superposition of patient structures.

A great advancement in radiological imaging was achieved in the 1970s with the advent of computed tomography (CT). CT generates an image of a transverse slice of a patient, and has improved upon projection imaging in many instances. CT has proven very useful in allowing the radiologist to examine images of particular cross-sectional slices of the patient in order to isolate the appearance of specific internal structures.

It would be helpful to certain radiological diagnoses to be able to view not only transverse slice images, but also slice images oriented along a longitudinal axis of the patient. However, there does not currently exist a method of generating practical, high-quality longitudinal x-ray slice images. CT, for example, is excellent at producing high-quality images of transverse slices, but is not capable of producing longitudinal images of many parts of patient anatomy due to the difficulty of orienting the patient properly in the small CT gantry. More contemporary techniques of using image processors with CT images to simulate longitudinal slices have also met with limited success. These more recent techniques acquire a set of contiguous CT slices which are "stacked" in a three-dimensional orientation in a computer image processor to render the appearance of slice images at arbitrary angles. These images have limited spatial resolution in the longitudinal direction, however, due to the finite separation between contiguous CT slices. Therefore, it has proven difficult to obtain adequate longitudinal slice images with a CT apparatus.

Many investigators have turned to older techniques in an effort to develop adequate longitudinal x-ray slice imaging. One such technique is classical geometric tomography, which has been known to the art for many years. Geometric tomography does not render perfect longitudinal slice images by itself, but has proven to be a foundation upon which many modern improvements have been built. Geometric tomography has several embodiments, such as linear tomography and circular tomography, each case being described by the geometry of motion of the x-ray tube and imaging device. Linear tomography is most illustrative to the present invention and will be described below.

The basic principle of geometric linear tomography will be explained with reference to FIG. 1. According to this basic tomographic system, patient 100 is located in a stationary position. X-ray tube 102 is located on one side of patient 100, and film 104 is located on the other side of patient 100. X-ray tube 102 emits x-rays 106 which pass through the patient and are received by film 104.

According to the principles of linear tomography, x-ray tube 102 and film 104 move in a coordinated fashion along linear paths on opposite sides of the patient 100. The x-ray tube 102 and film 104 move in opposite directions, each with a specified linear velocity. During the course of the movement, x-ray tube 102 moves from point 110 to point 112, and film 104 moves from point 114 to point 116. There is a fulcrum plane 118 which contains the point 120 about which the tube 102/film 104 combination pivots. The height of this fulcrum plane 118 is determined by the relative linear velocities of the tube 102 and film 104.

In theory, any patient structures which lie within the fulcrum plane 118 will be in focus on the exposed film following the tomography scan. This effect is a result of the geometry of movement, which causes the projected positions of structures in the fulcrum plane to maintain the same position on the film as the film and the tube move. However, any structures that do not lie in fulcrum plane 118 will be blurred out on the exposed film, since the projected position of these structures will not move at the same velocity as the film. For example, consider points 120 and 122 in the patient. Point 120 lies in the fulcrum plane 118. At the initial film position 114, the point 120 projects onto the film at location 130. After complete movement of the tube 102 and film 104, the projected position of point 120 is location 131. Due to the motion of film 104, points 130 and 131 are at the same location on the film. Hence, any structure at point 120 in the patient would appear in sharp focus on the exposed film 104. In contrast, consider the motion of point 122 which lies outside the fulcrum plane 118. At the initial film position 114, the projected position of point 122 is at location 140. After film movement, the projected location of point 122 is at location 141. Points 140 and 141 are not at the same location on the film. Hence, the projected position of point 122 has swept over a large portion of the film, resulting in a blurred appearance. Therefore, linear tomography allows an image to be formed on the film which contains structures from fulcrum plane 118 in sharp focus, and which also contains out-of-plane structures blurred by varying amounts.

Linear tomography permits an improved examination of structures in the region of the fulcrum plane relative to other superposed patient structures. However, the presence of blurry, out-of-plane structures degrades the ability to visualize low-contrast objects in the plane of interest (fulcrum plane). For example, linear tomography is commonly used for examining the urinary system, since the kidneys, ureters, and bladder may be considered to be in one "thick" plane, or "slice". This technique requires, however, the use of intravenous contrast agent, without which the urinary system structures would lack adequate visible contrast to distinguish them from the blurry overlying abdominal structures. Therefore, although geometric tomography permits an improved view of a specified plane, or slice, of interest, it still is not suitable for general longitudinal imaging except in cases of imaging high contrast objects.

Various improvements have been made to classical geometric tomography. One such improvement is digital tomosynthesis, as described in the reference by D. G. Grant: "Tomosynthesis: A three-dimensional radiographic imaging technique." IEEE Trans. Biomed. Eng., 19(1):20–28, 1972, the disclosure of which is incorporated herein by reference. Digital tomosynthesis is a technique similar to geometric tomography, except that it permits retrospective reconstruction of tomographic images at variable in-focus plane heights. The ability to reconstruct an arbitrary number of images with in-focus planes different than the original fulcrum plane is the strength of tomosynthesis. This process is achieved by taking a set of discrete images while the x-ray tube and film are moving, as opposed to one continuous image with traditional geometric tomography. Using the digital tomosynthesis technique, the projection images are then shifted relative to one another and added together to give the tomosynthesized image. The amount of shifting of each image determines which projected structures in the patient will be made to appear as though they did not move relative to the film. Hence, the amount of shifting of projection images determines the height of the reconstructed focal plane.

The tomosynthesis reconstruction process is depicted in more detail in FIGS. 1B, 1C and 1D. The tomosynthesis device is shown in FIG. 1B. X-ray tube 102 moves from position 110 to position 111 finally to position 112. At each of these positions a discrete image is obtained. The image from position 110 is recorded at film position 114. Images from positions 111 and 112 are recorded at film positions 115 and 116, respectively.

FIG. 1C shows the process for shifting and adding the three images to bring one of the patient planes into focus. FIG. 1C, specifically, shows the process for obtaining the ° into focus. In order to obtain this structure in focus, the images are added without shifting, since the ° lies in the fulcrum plane. When this occurs, the ° will be in focus and the Δ will be blurred.

FIG. 1D shows the process for obtaining the Δ in focus with the ° blurred. Film position 1 is shifted with respect to film position 2 which is shifted with respect to film position 3. The three images are then added to obtain the Δ in focus and the ° blurred.

Digital tomosynthesis, like classical geometric tomography, results in images that contain blurry structures from all planes in the patient, in addition to the in-focus structures from the plane of interest. Hence, while tomosynthesis is far more flexible than traditional geometric tomography, it still suffers from the same image degradation from blurry out-of-plane structures.

There have been a number of other techniques investigated for improving the quality of longitudinal slice images. These techniques basically attempt to remove the blurry artifacts from out-of-plane structures from tomographic or tomosynthetic images. These techniques fall into various categories which will be described below. First, various authors have described matrix algebra approaches to the solution of exact longitudinal tomographic images. Matrix algebra approaches basically use the knowledge of the imaging process in combination with a finite set of rendered tomographic or projection images to solve for patient structures in a finite set of planes. References to this approach include: L. T. Chang, B. Macdonald, V. Perez-Mendez: "Axial Tomography and Three Dimensional Image Reconstruction." IEEE Trans. Nuc. Sci. 23(1):568–572, 1976; and D. Townsend, C. Piney, A. Jeavons: "Object Reconstruction from Focused Positron Tomograms." Phys. Med. Bio. 23(2):235–244, 1978; the disclosures of all of which are incorporated by reference. Each of these techniques teaches a matrix algebra approach to tomographic image reconstruction. However, the application envisioned by Chang, et al. and Townsend, et al. was nuclear medicine, not x-ray transmission imaging. Moreover, the reference to Chang, et al. does not teach methods for overcoming difficulties in reconstructing low spatial frequencies in the images, such problems arising from matrix difficulties in the presence of image noise. (A further elaboration of the problem of image noise in matrix algebra reconstruction will be provided later). Townsend, on the other hand, teaches a method for addressing the problem of reconstructing low spatial frequencies by invoking an approximation of the matrix describing the imaging process. Townsend, does not, however, teach methods for improving the rendering of structures that lie between reconstructed image planes, and hence would be subject to some contamination of the images by structures not lying exactly in one of the reconstructed planes.

A second category of longitudinal imaging techniques uses a summation of appropriately filtered tomographic or projection images to eliminate the blurry artifacts from longitudinal slice images. These techniques are akin to the matrix techniques except for the methodology used for determining the nature of the blurry artifacts to subtract. Example references include: H. E. Knutsson, P. Edholm, G. H. Granlund, C. U. Petersson: "Ectomography—a new radiographic reconstruction method—1. theory and error estimates." IEEE Trans. Biomed. Eng. 27(11):640–648, 1980; D. N. Ghosh Roy, R. A. Kruger, B. Yih, P. Del Rio: "Selective plane removal in limited angle tomographic imaging." Med. Phys. 12(1):65–70, 1985; and S. P. Wang, R. H. Morgan and D. F. Specht: U.S. Pat. No. 4,598,369, all of which are incorporated by reference. In each of these techniques, an estimation of the blurry artifacts from structures in all planes of the patient are made. These estimated blurred artifacts are then subtracted from the individual tomographic images. The reference to Knutsson, et al., however, introduces other structured artifacts into the images. The technique of Ghosh Roy, et al. also introduces edge artifacts into the plane of interest. In other words, the methods of Ghosh Roy and of Knutsson do not render unaltered versions of the plane of interest. Wang, et al., on the other hand, teach clarification of tomographic images by successive subtracted of blurred adjacent tomographic images. The approach of Wang permits successive approximation to the desired image, but does not teach the exact solution of said image as is taught by the various matrix inversion techniques. Hence, great tedium could be required with the technique of Wang in establishing the desired subtraction and blurring procedures.

To address the aforementioned problems in the prior art, the present invention teaches new methods for producing improved longitudinal x-ray slice images. These methods eliminate the blurry out-of-plane artifacts without introducing substantial artifacts in the planes of interest. These methods also provide improved reconstruction of low spatial frequencies in the presence of image noise, and enable more suitable rendering of patient structures not lying exactly in one of the reconstructed planes.

The present invention uses an x-ray source and x-ray detector which move in opposite directions along linear paths on either side of the patient, in accordance with the technique of linear tomography. A plurality of x-ray images are produced at predetermined intervals along the movement path of the x-ray source and detector. This set of discrete images is then loaded into a computer memory in which they are shifted and added together to form tomosynthesized images. Tomosynthesized images are generated for a predetermined number of planes in the patient. These tomosynthesized images contain blurry structures from the entire patient in addition to the structures from the planes of interest. Since the geometry of x-ray source/detector movement is well known, the precise amount of blurring which has occurred for structures at any plane in the patient can be calculated. The set of tomosynthesized images in conjunction with the known blurring properties of every plane will permit exact solution of the structures in each plane.

The method of solution for the structures in each plane is a matrix algebra approach similar to that described in Chang, et al. and Townsend, et al. Specifically, the tomosynthesized image of each plane can be written as an equation including actual structure from that plane and blurred structures from every other plane. The plurality of equations for all planes thus defines a matrix equation which contains information about all structures in the chosen planes inside the patient. The matrix in this matrix equation describes the nature of the blurring artifacts that occur when any plane is tomosynthesized. Once the matrix has been calculated, matrix algebra may be used to remove the blurred structures from any given plane. Specifically, a matrix equation is produced in which the left-hand side represents the tomosynthesized images of every plane. The right-hand side contains the matrix of blurring functions convolved with the as yet unknown patient structures in every plane. The Fourier transform is taken of both sides of the equation, and the inverse of the matrix of blurring functions is calculated. The inverse matrix then multiplies both sides of the matrix equation in order to eliminate the blurring matrix from the equation. The inverse Fourier transform of the equation is then taken to yield a matrix equation in which the unknown patient structures are solved for in terms of the known tomosynthesized images. Any of the set of planes in the patient may be chosen and an image produced of that plane without blurred structures from other planes.

There are certain properties of the matrix inversion mathematics that lead to undesirable results. For example, the low spatial frequency components of the reconstructed images are poorly determined under certain circumstances. In particular, the presence of noise in the projection images gives rise to inaccurate reconstruction of low spatial frequencies due to poor conditioning of the imaging matrices at low spatial frequencies. Moreover, the matrix inversion technique does not permit the zero spatial frequency component (i.e., the "DC" image component) to be reconstructed at all (as pointed out in Chang et al) as a solution to the mathematical equation for the zero spatial frequency is indeterminate. The present invention solves these problems in new and advantageous ways.

There is an additional problem; namely, that patients are not exactly described by a finite set of planes, but rather contain a continuum of structures. The matrix inversion approach solves in an exact manner only for those structures actually lying in one of the preselected planes. Hence, the structures in the patient lying between planes are reconstructed only in an approximate fashion. If the imaging geometry is not chosen carefully, these between-plane structures may be reconstructed in an unsuitable manner such that they show up as contaminating artifacts in the other planes. The present invention defines a new technique to minimize the problem with reconstruction of between plane structures.

In order to permit the solution of the zero spatial frequency components, and in order to minimize any problems from low spatial frequency reconstruction with matrix inversion techniques, and in order to improve the reconstruction of between-plane structures, the present invention uses a plurality of advantageous techniques as described below.

A first technique uses weighting factors or digital filtering for the original projection images in order to tailor the appearance of between-plane structures in the final reconstructed planes. Each discrete x-ray image taken by the moving x-ray tube and detector is weighted with a different factor, in order to modify the effective modulation transfer function for between-plane structures.

A second aspect of the invention determines the zero spatial frequency component of each image by subtracting an appropriate overall constant from each reconstructed line of each plane. This forces the edge of each image plane to zero, since outside the patient the image values should all be zero. Accordingly, this procedure reconstructs proper zero spatial frequency values for each image.

A third aspect of the invention is the use of an iterative technique to correct for errors in determining the lowest spatial frequency components in the reconstructed images. The iterative technique adds varying amounts of low spatial frequency components to the reconstructed images. The iterative technique adds varying amounts of low spatial frequency components to each reconstructed line of each image plane until the region at the very edge of the image becomes flat. Using this technique, approximately ten percent of the image on either side of the patient is used to calculate the errant low frequency components present in all the reconstructed image. The values are then subtracted from the overall images to yield flat images in the image edge regions.

A fourth aspect of the invention uses a hybrid technique that improves calculation of low spatial frequency components, while also improving the reconstruction of between-plane structures. Specifically, the mid- and high-frequencies are reconstructed from image data acquired from a narrow swing of the x-ray tube. The narrow swing provides better handling of between-plane structures but demonstrates worse reconstruction of low frequencies due to an increased sensitivity to image noise. A second set of image data is then also acquired from a very wide swing of the x-ray tube. The wide swing data is much less subject to noise problems at low spatial frequencies. The low spatial frequency components from the wide swing data are then substituted for the low spatial frequencies in the narrow swing reconstruction. The result is good reconstruction of between-plane structures and reduced problems at low spatial frequencies. In practice, the wide and narrow data sets may be both acquired during the same pass of the x-ray tube.

The approximation of Townsend is not necessary according to the present invention, which reduces noise-induced low spatial frequency reconstruction problems using iterative and hybrid evaluations of data outside the patient.

In summary, the present invention combines geometric x-ray tomography, digital tomosynthesis, matrix inversion mathematics, variable weighting of original projection images for improved reconstruction of between-plane structures, calculation of zero spatial frequency image components, iterative or hybrid techniques for improving low spatial frequency components in the presence of image noise, and a hybrid technique for improved rendering of between-plane structure. The resulting apparatus and method allow improved longitudinal x-ray slice imaging. In addition, this device should be less expensive than a computerized tomography machine with the potential for acquiring multiple slice images more quickly than CT. The present invention also applies matrix inversion longitudinal slice reconstruction to x-ray imaging, while many of the previous schemes envisioned application only in nuclear medicine. Further advantages of the system will be described throughout the specification.

BRIEF DESCRIPTION OF THE DRAWINGS

An exemplary and presently preferred embodiment of the invention will be described in detail with reference to the accompanying drawings wherein:

FIG. 7 shows a flowchart-type diagram of the DC correction technique;

FIG. 8 shows a flowchart diagram of the interleaving technique; and

FIGS. 9A–9D shows how the inverse blurring matrix is obtained; and

DETAILED DESCRIPTION OF THE PREFERRED EMBODIMENTS

Figure 1:
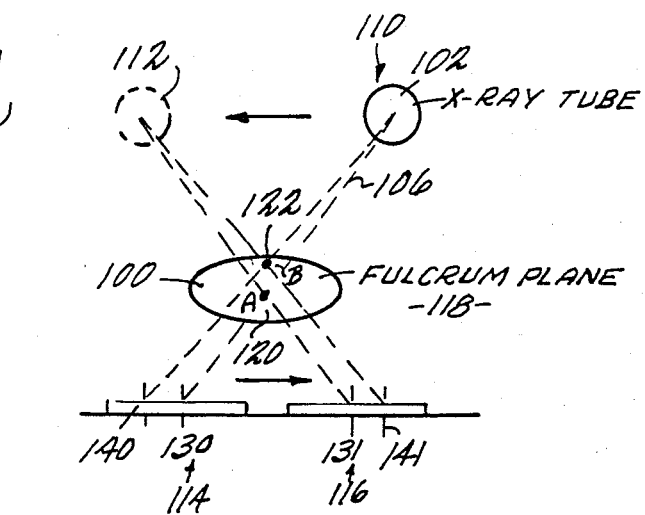
FIG. 1 shows the basic technique and layout of linear tomography.

Matrix inversion mathematics, which have been described in the prior art, are essential to the understanding of the technique of the present invention. Accordingly, such matrix inversion mathematics will be described first herein.

Conceptually, the matrix inversion technique solves for the in-focus structures, and therefore eliminates out-of-focus structures. The blurring of all structures in a patient can be controlled by the geometry of tube/film movement. Experience will tell a skilled artisan precisely how much blurring has occurred for structures at any plane in the patient, since the imaging geometry is known. Matrix inversion techniques basically use the knowledge of how much blurring occurs in a given plane reconstruction based on the structures in every other plane. Using this information, an equation is written to describe each reconstructed tomosynthesis plane. This equation is solved, yielding a mathematical representation of what each plane must look like without the attendant blurring. In other words, matrix inversion undoes the blurring that occurs in each plane, and subtracts an appropriate amount of undesired blurring from each image reconstruction.

Matrix inversion mathematics are most adequately described by using the shorthand notation typically used in matrix algebra.

Assume for purposes of explanation of the matrix inversion mathematics that a patient is comprised of N planes, each plane containing a number of structures. $t_i(X,Y)$ defined as the tomosynthesized image of plane i. The t images are thus the standard tomosynthesized images including the desired structures in plane i and the undesired blurred images from the other $N-1$ planes. If we use $P_i(X,Y)$ as the actual structures in plane i (such as the attenuation coefficient of the tissues at pixel (X,Y) for x-ray imaging), the tomosynthesized images t may be described in terms of the patient structures for each plane as:

$$t_i = f_{i1}*P_1 + f_{i2}*P_2 \ldots f_{in}*P_n \qquad (1)$$

In this equation, $f_{ij}$ represents the blurring function describing the blurring of patient structures from plane j in the tomosynthesized image of plane i with the component $f_{ii}*P_i$ representing the unblurred contribution of structures from plane i ($f_{ii}$ being a delta function since $\delta*P_i = P_i$). The "*" terminology denotes a spatial convolution which is a mathematical term for blurring. The (x,y) coordinates have been suppressed in equation (1) for simplicity.

An equation such as equation (1) may be written for each of the reconstructed tomosynthesized planes 1 through n as:

$$\begin{aligned}
t_1 &= f_{11}*p_1 + f_{12}*p_2 + \ldots f_{1n}*p_n \\
t_2 &= f_{21}*p_1 + f_{22}*p_2 + \ldots f_{2n}*p_n \\
&\phantom{=} \vdots \\
t_n &= f_{n1}*p_1 + f_{n2}*p_2 + \ldots f_{nn}*p_n
\end{aligned} \qquad (2)$$

These equations may be defined in matrix notation as $$\begin{bmatrix} t_1 \\ t_2 \\ \vdots \\ t_n \end{bmatrix} = \begin{bmatrix} f_{11} f_{12} \ldots f_{1n} \\ f_{21} f_{22} \ldots f_{2n} \\ \vdots \\ f_{n1} f_{n2} \ldots f_{nn} \end{bmatrix} * \begin{bmatrix} p_1 \\ p_2 \\ \vdots \\ p_n \end{bmatrix} \qquad (3)$$

Equation (3) can be defined more succinctly by letting T and P be shorthand notations for the N component vectors $t_1$ through $t_n$, and $p_1$ through $p_n$, respectively. Using the notation F for the matrix of blurring functions $f_{ij}$, we obtain:

$$T = F * P \quad (4).$$

Accordingly, the actual patient structures P, without any blurring from other planes, are a factor in this equation. Since the actual patient planes are the desired data, one desires to solve equation (4) for P.

In the present invention, this is done by first taking the Fourier transform of both sides of equation (4). This is done to simplify the calculation, because Fourier transformation converts convolution into the simple mathematical procedure of multiplication. The fourier transform yields the equation:

$$\tilde{T} = \tilde{F}\tilde{P} \quad (5).$$

where the ~ indicates a Fourier transform has been taken. $\tilde{P}$ can then be determined in a straight-forward manner if the matrix $\tilde{F}$ has an inverse. A matrix inverse is well known as being the matrix which yields the unit matrix when multiplied by the original matrix, or:

$$\tilde{F}^{-1} \cdot \tilde{F} = \tilde{I} \quad (6).$$

It may be shown by trial and error that matrix inverst $\tilde{F}^{-1}$ exists for all spatial frequencies except $f_s = 0$. Therefore, since this inverse matrix exists, we multiply both sides of equation (5) by the inverse matrix to obtain:

$$\tilde{F}^{-1} \cdot \tilde{T} = \tilde{F}^{-1} \cdot \tilde{F} \cdot \tilde{P} = \tilde{P} \quad (7).$$

Therefore, a solution for P may be exactly obtained by multiplying the tomosynthesized hector $\tilde{T}$ by the inverse matrix $\tilde{F}^{-1} \cdot \tilde{F}^{-1}$ may be easily calculated since $\tilde{F}$ is known or can be determined by the geometry of tube/film movement. This is described in detail later in reference to FIGS. 9A-9D.

The above-discussed procedure is the basis of matrix inversion mathematics. There will be a matrix equation (7) for each spatial frequency in the image, since $\tilde{T}$, $\tilde{P}$ and the matrix $\tilde{F}$ are all functions of spatial frequency. Once equation (7) has been generated, the actual patient structure vector P may be determined by taking the inverse Fourier transform of $\tilde{P}$ as:

$$P = F.T.^{-1}\{\tilde{P}\} \quad (8).$$

An embodiment of the invention will now be defined with reference to the accompanying drawings.

It is assumed herewith that one having ordinary skill in the art knows the basic functions and layouts of a typical tomographic x-ray-apparatus. For example, such structure is described in U.S. Pat. No. 4,570,263, the disclosure of which is expressly incorporated herein by reference. Other similar patents are also known by those of skill in the art. The present invention is carried out using the structure shown in FIG. 2. X-ray source 102 is used over patient 100. Patient 100 is positioned on a patient table 150. An image-receiving structure 160 is located under patient 100 such that the emanations from x-ray source 102 are received by image-receiving structure 160. A mechanical gantry 170 must also be connected between image receiving structure 160 and x-ray source 102 to allow the two structures to pivot with respect to one another and maintain the same pivot point 162. The x-ray source 102 moves in linear fashion along trajectory 180 and the image receiving device 160 moves linearly along trajectory 190.

The image-receiving device 160 can be any image-receiving device. Film has been very common in the prior art, but would require additional structures in order to digitize the picture, once taken. Therefore, an electronic detector is more advantageous. Electronic detectors typically generate signals which are connected to some processing device. Many different detectors may be used. One such detector is the photostimulable phosphor detector such as the Philips Computed Radiography device from Philips Medical Systems Inc. This photostimulable phosor detector, or PSP, includes a solid state material that temporarily stores a latent image proportional to the detected x-ray flux. The detector plate is subsequently read-out by laser scanning. A disadvantage of this device is that the sheets must be moved into and out of the x-ray beam and sent to the read-out device. In the present invention, such PSP detectors would be located, for instance, on a conveyor belt under the patient table, so that they could be easily moved in a mechanized fashion.

An alternate image receiving structure which could be used is, for example, an image intensifier. Image intensifiers receive x-rays as an input and convert these x-rays to visible photons and then to electrical signals by means of an attached video camera. Image intensifiers are advantageous due to the ease with which images can be acquired in rapid sequence and transferred to a computer device. However, image intensifiers have a disadvantage of causing geometric distortion near the image edges.

The ideal detector would be a large area flat, fully electronic detector. However, such detectors are not in practical use at this time. Therefore, either the PSP or the image intensifier can be used as the image receiving structure according to the present invention.

The output of image receiving structure 160 is connected to image buffer 171 which includes the necessary circuitry for converting the output from image receiving device 160 into a digital signal suitable for use with a programmed computer. The output of buffer 171 is connected to computer 200. Computer 200 performs the various processing steps on the input data and generates the matrix inversion tomosynthesis images. The resulting images are converted to an electrical signal and sent to an appropriate image display 210. An optional array processor 220 is connected to computer 200 in order to speed up the computations necessary for the matrix inversion and/or the Fourier and inverse-Fourier transform. Array processor 220 may include a hardware Fast-Fourier transform (FFT) device 222.

The computer 200 also will typically include a memory device 230 such as a hard disk or the like. Any other desired external structures can also be used with this device. The computer can be of any known type which performs processing functions, such as a VAX 11/780 or Sun 3/160.

In operation, tomographic images are obtained by the linear tomography machine 98, which includes source 102, gantry 170, and image receiver 160, and are connected to image buffer 171, which couples this data to computer 200. Computer 200 then operates according to the flow charts of FIGS. 3-10.

Figure 2:
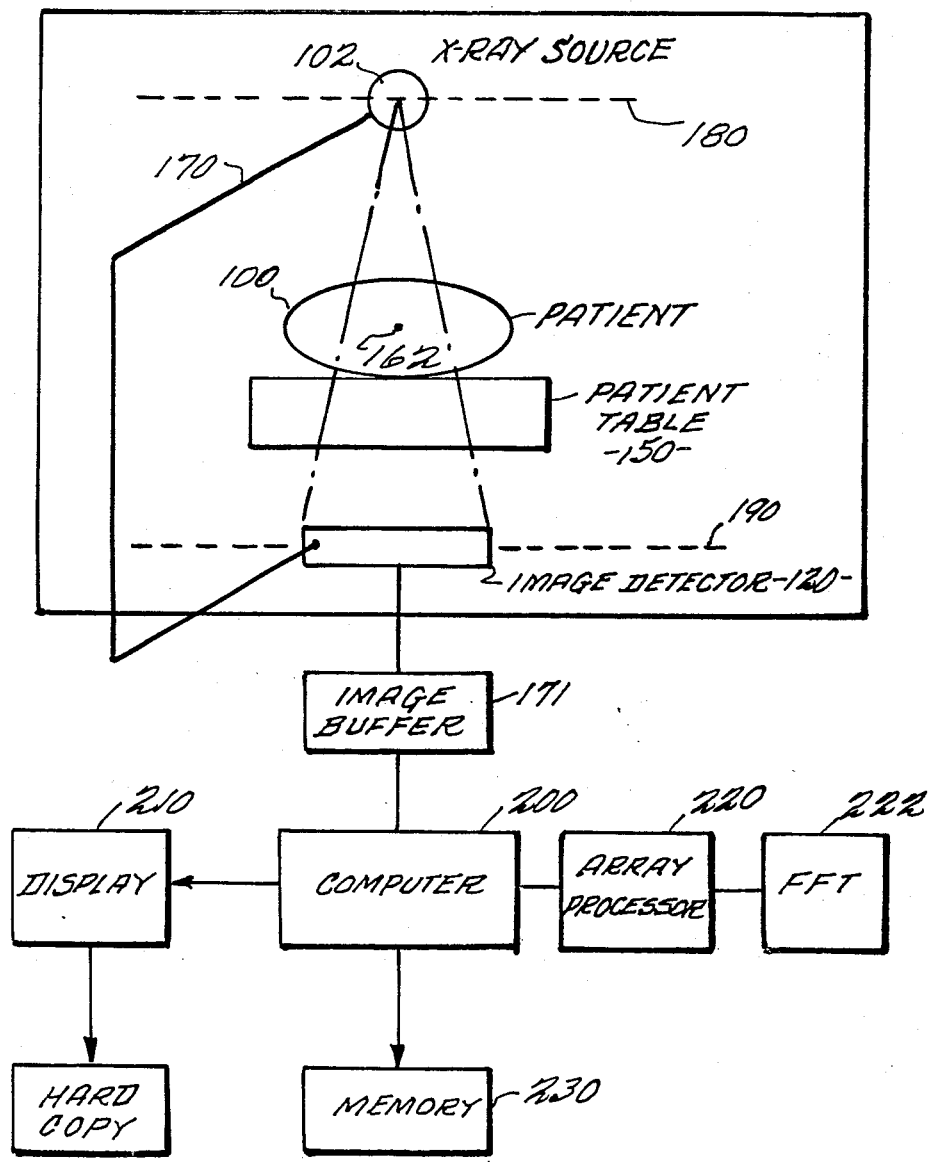
FIG. 2 shows a block diagram embodiment of the present invention.
Figure 3:
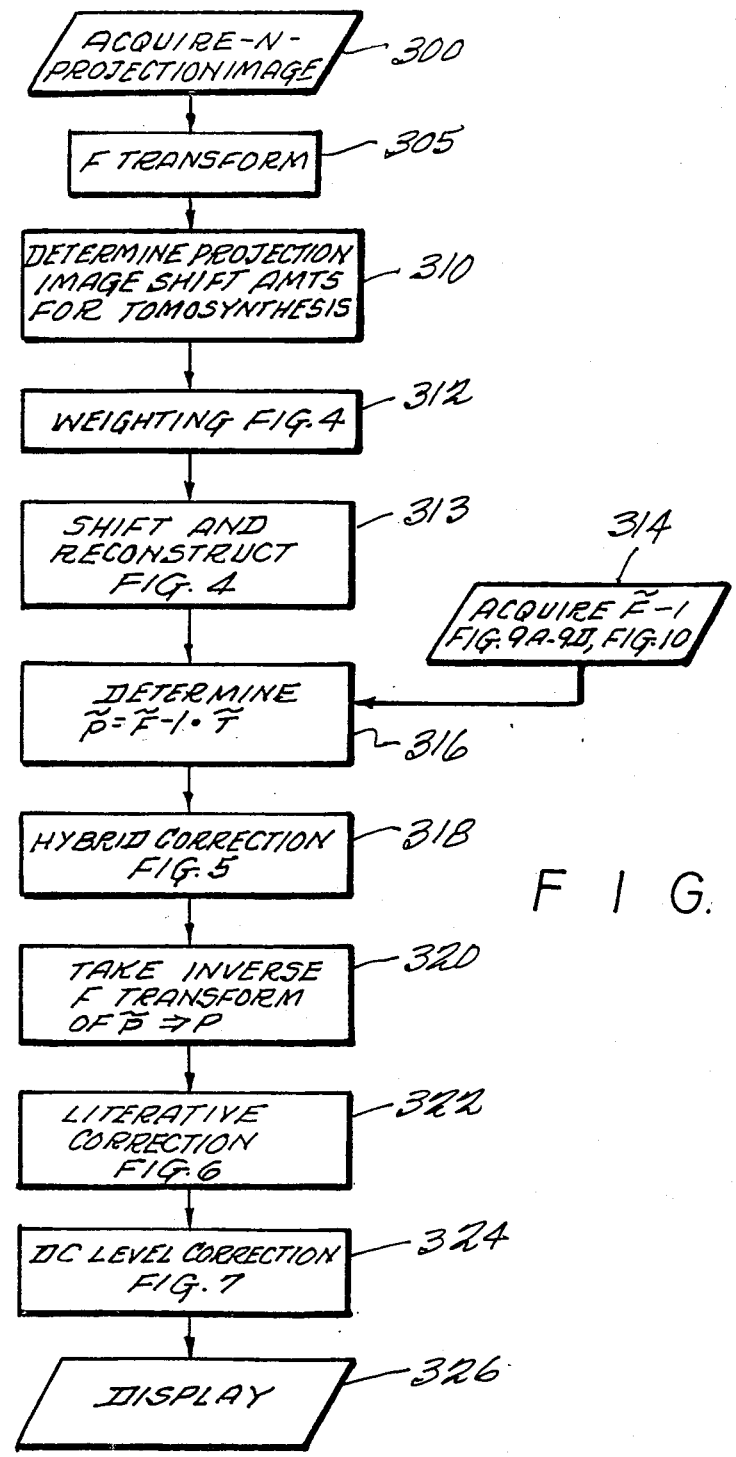
FIG. 3 shows the main flowchart loop executed by the computer of FIG. 2.

FIG. 3 shows the flow chart used by computer 200 of FIG. 2 in summary form. More detail is shown in the accompanying FIGS. 4, 4A and 5-8. As a summary, however, step 300 of FIG. 3 shows acquiring the N projection image from image receiving structure 160 through buffer 171 into computer 200. These projection images are Fourier transformed at step 305, and appropriate shift amounts for tomosynthesis are determined at step 310. The shifting necessary for such tomosynthesis is described in the Grant reference, which has been incorporated herein by reference. Following this determination of proper image shift, the first correction routine according to the present invention is executed at step 312. Step 312 describes the weighting function used according to the present invention to improve the rendering of between-plane structures. This weighting function is described in more detail with reference to FIGS. 4 and 4A.

After this weighting function is completed, the vector which was described above as $\tilde{T}$ is formed at step 313 by shifting and reconstructing according to the Grant teaching.

Step 314 shows the steps of acquiring the inverse blurring matrix $\tilde{F}^{-1}$. The steps of acquiring this matrix are shown, herein with reference to FIGS. 9A–9D, 10. Step 314 is entitled acquiring of the $\tilde{F}^{-1}$ matrix, and may include the steps of calculating this matrix or may merely include the steps of reading the terms of this matrix from a memory where it is prestored.

Accordingly, both $\tilde{T}$ and $\tilde{F}^{-1}$ are received as input parameters to step 316. Step 316 uses this data according to the matrix inversion mathematics to determine $\tilde{P}$. This array multiplication may be done by array processor 220 in order to speed processing.

Step 318 follows the calculation of $\tilde{P}$ and is the second correction routine according to the present invention. Step 318 represents the hybrid correction routine. This hybrid correction routine is shown in more detail in FIG. 5. In step 320, after the hybrid correction, the inverse Fourier transform of $\tilde{P}$ is taken to yield the vector P. Step 322 shows the third correction algorithm according to the present invention. This represents the iterative correction routine shown in more detail in FIG. 6. After the iterative correction is completed, the DC level correction is executed at step 324 and in more detail in FIG. 7. The DC level corrected signal is then displayed at step 326.

The detailed steps discussed herein will be described in more detail with reference to the remaining figures and throughout this application. It should be noted by one having ordinary skill in the art that any of the weighting correction of step 312, the hybrid correction of step 318, the iterative correction of step 322, or the DC level correction of step 324 can be independently performed. That is, any one of these steps can be performed without any of the others or with any combination of these steps.

Figure 4:
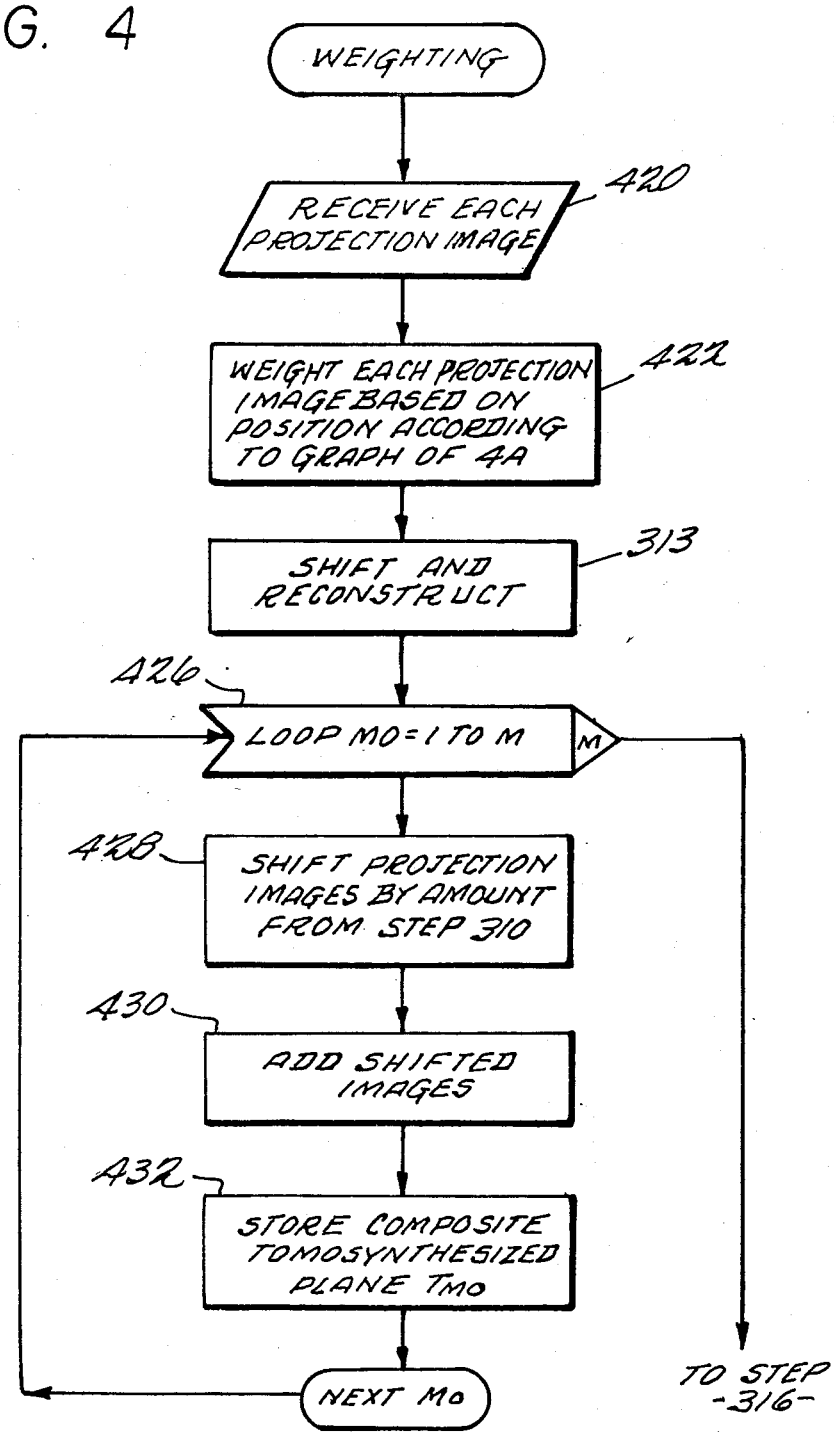
FIG. 4 shows the weighting and the shift and reconstruct functions executed by the flowchart of FIG. 3.

The detailed flow chart describing the weighting routine will now be described herein with reference to FIG. 4. FIG. 4 shows the weighting routine according to the present invention as shown at step 312 at FIG. 3. The input flow to the weighting routine should receive a plurality of projection images. In addition, the projection image shift amounts for tomosynthesis have been determined at step 310. Accordingly, the first step in this process is to weight each projection image according to a weighting function. According to this embodiment, the weighting function is shown in FIG. 4A.

Figure 1B:
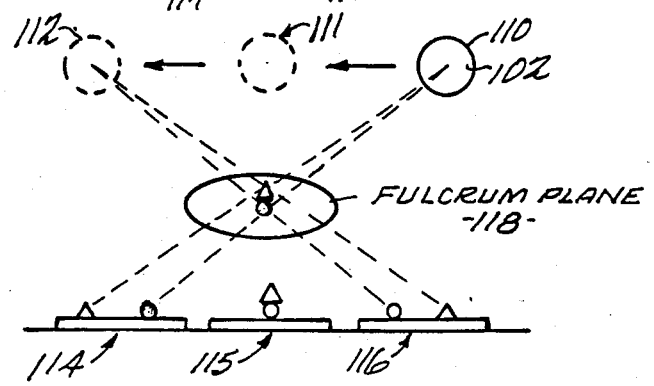
FIGS. 1B–1D show the basic technique of digital tomosynthesis.
Figures 1C, 1D:
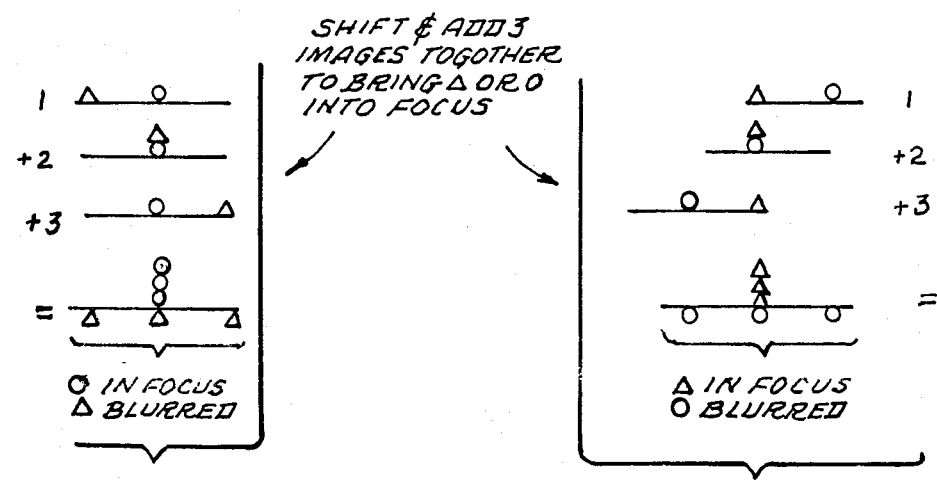
Figure 4A:
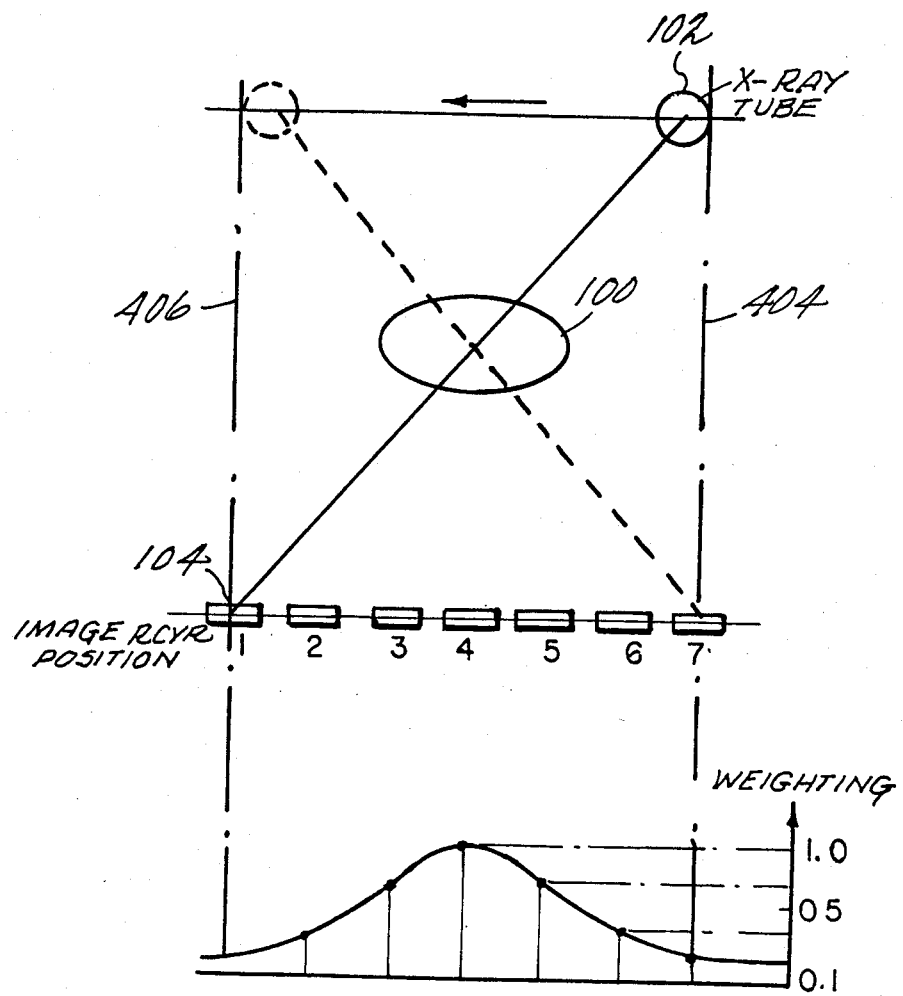
FIG. 4A shows the weighting function used according to FIG. 4.

X-ray source 102 and image detector 104 are shown in FIG. 4A. There are also indicated seven positions of the image detector 104, identified by numerals 1–7 in this example and corresponding to the positions described above in FIG. 1B. These seven positions of detector 104 represent the locations of the projection images acquired during the tomographic scan. As can be seen in FIG. 4A, a weighting function is assigned to each projection image based on its proximity to the ninety-degree orientation of tube and detector. At the furthest outward positions 1 and 7, the weighting is very low, for example in the range of 0.15. This weighting gradually increases to 1.0 for the projection image taken with ninety-degree orientation of tube and film (position 4).

Therefore, in operation of FIG. 4, each projection image is received at step 420. Each image is then weighted appropriately according to the graph of FIG. 4A at step 422. In this way, the projection images depicting patient structures shifted the most aggressively are weighted by an amount much less than the weighting of the ninety-degree projection image.

Structures that lie between planes are not capable of being reconstructed exactly, since the matrix inversion only solves exactly for structures that lie on the preselected planes. However, it is clearly desired that the matrix inversion tomosynthesis technique handle between-plane structures in a manner consistent with proper anatomical interpretation of the images. For example, it would inappropriate for structures between planes 1 and 2 to show up in all other reconstructed images of the patient. Moreover one would like to maintain as many as possible of the between-plane structures in order to give some finite thickness to the reconstructed plane images. The inventors of the present invention have found that weighting the projection images each by a constant value as given in FIG. 4A has the advantageous effect of improving the reconstruction of between-plane structures. Specifically, using a weighting function such as a Gaussian function improves the reconstruction of between-plane structures by minimizing the degree to which between-plane structures appear in images of planes other than the nearest neighboring planes. Furthermore, if a narrow swing of the x-ray tube is used for data acquisition, in conjunction with the weighting technique, then the between-plane structures are shared almost entirely by their two nearest neighboring planes, in a proportion equal to the relative distance between the two planes. One skilled in the art may further optimize the parameters of this weighting technique for other imaging geometrics.

After each image is weighted in step 422, the shift and reconstruct routine begins at step 313. This routine begins by setting up a loop of 1 to M at step 426, where M is the preselected number of planes chosen to span the patient. At step 428, the projection images are shifted by an amount previously determined at step 310. Since the Fourier transform has already been taken in step 305, the shifting of images is accomplished by multiplying the Fourier transform of each projection image by a phase factor $\exp(-2\pi i \mu a)$, where $\mu$ is the spatial frequency and "a" is the amount of the desired shift. This shifting technique is the well-known Fourier shift theorem. The shifted images are then added together at step 430 and are stored as a tomosynthesized image t at step 432. The loop then returns step 426 where function is incremented so that the next plane can be shifted and added to be stored as the next tomosynthesized plane. At the end of the loop, control passes to step 316 of FIG. 3.

The hybrid correction routine of step 318 will now be discussed with reference to FIG. 5.

It has been found by the present inventors that a narrow swing of the x-ray source, provides better handling of between-plane structures in matrix inversion tomosynthesis. However, this narrow swing demonstrates worse reconstruction of low frequencies due to an increased sensitivity to image noise. Contrastingly, image data acquired from a wide swing of the x-ray source is much less subject to noise problems in reconstruction of low frequencies, but has somewhat less optimal handling of between-plane structures. The inventors of the present invention have determined a technique in order to combine the advantages of both techniques—by using the mid-and high-frequency reconstructions from image data from a narrow swing of the x-ray source, and using the low frequency reconstructions from images from a wide swing of the x-ray source. In practice, both data acquisitions can be acquired during a same pass of the x-ray source.

Figure 5:
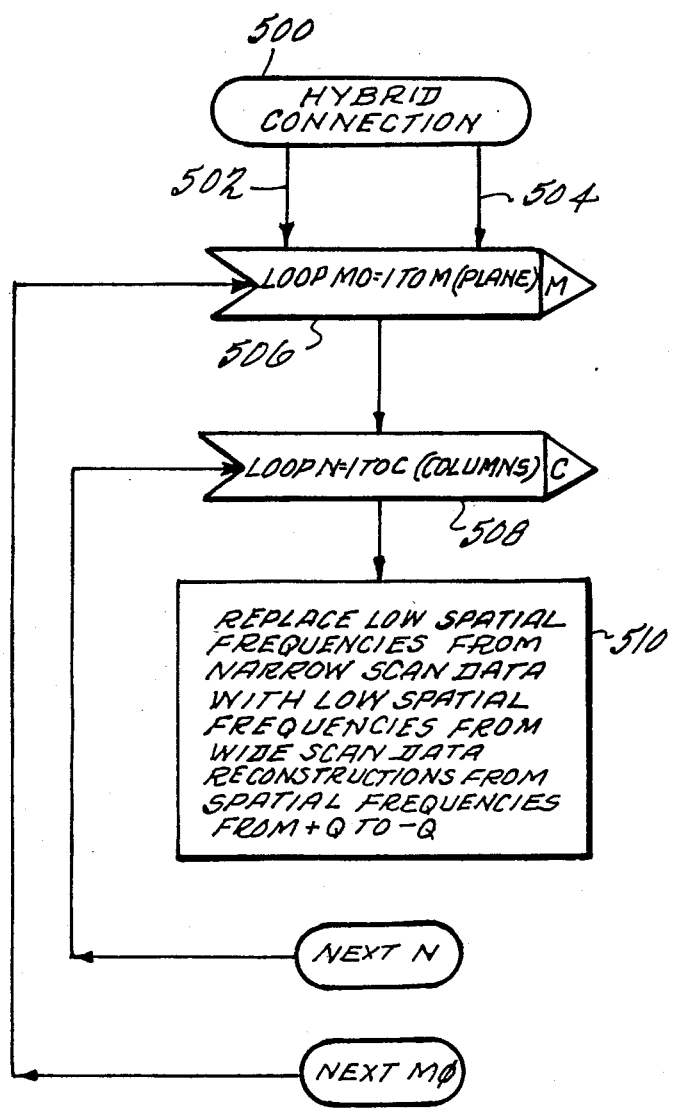
FIG. 5 shows a flowchart of the hybrid correction routine of FIG. 3.

The detailed flowchart for this technique is shown in FIG. 5. FIG. 5 acts on the Fourier transformed reconstructed vector $\tilde{P}$. Therefore, the hybrid technique operates in "frequency space" on a Fourier transformed element. The operation is shown beginning at step 500. Two sets of tomosynthesis images are used, a wide data scan set 502 and a narrow data scan set 504. Each of these scans has M planes of tomographic images, as above in the weighting technique. According to the hybrid correction technique, however, two sets of nested loops are formed. A first set of loops is formed as loop 506, which loops from 1 to M, where M is the number of reconstruction planes. Within each of the passes of main loop 506, a second loop is formed from 1 to C, where C is the number of columns of the image, the columns being parallel to the direction of motion of the x-ray tube and detector. Step 510 is executed for each column of each plane. Specifically, step 510 executes an operation to replace the low spatial frequency reconstructions from a narrow scan with the low spatial frequency reconstructions from the wide scan data. This is straightfowardly accomplished, as this operation occurs in the frequency domain (Fourier transformed data).

Upon finishing this correction for all of the data in all columns of all planes, control passes to step 320 in FIG. 3 where the inverse Fourier transform of P is taken to yield the vector $\tilde{P}$. Two correction routines are then executed on this vector P in the spatial domain. These correction techniques are for the purpose of improving low spatial frequency reconstruction, and for regenerating the proper image zero spatial frequency values.

Figure 6:
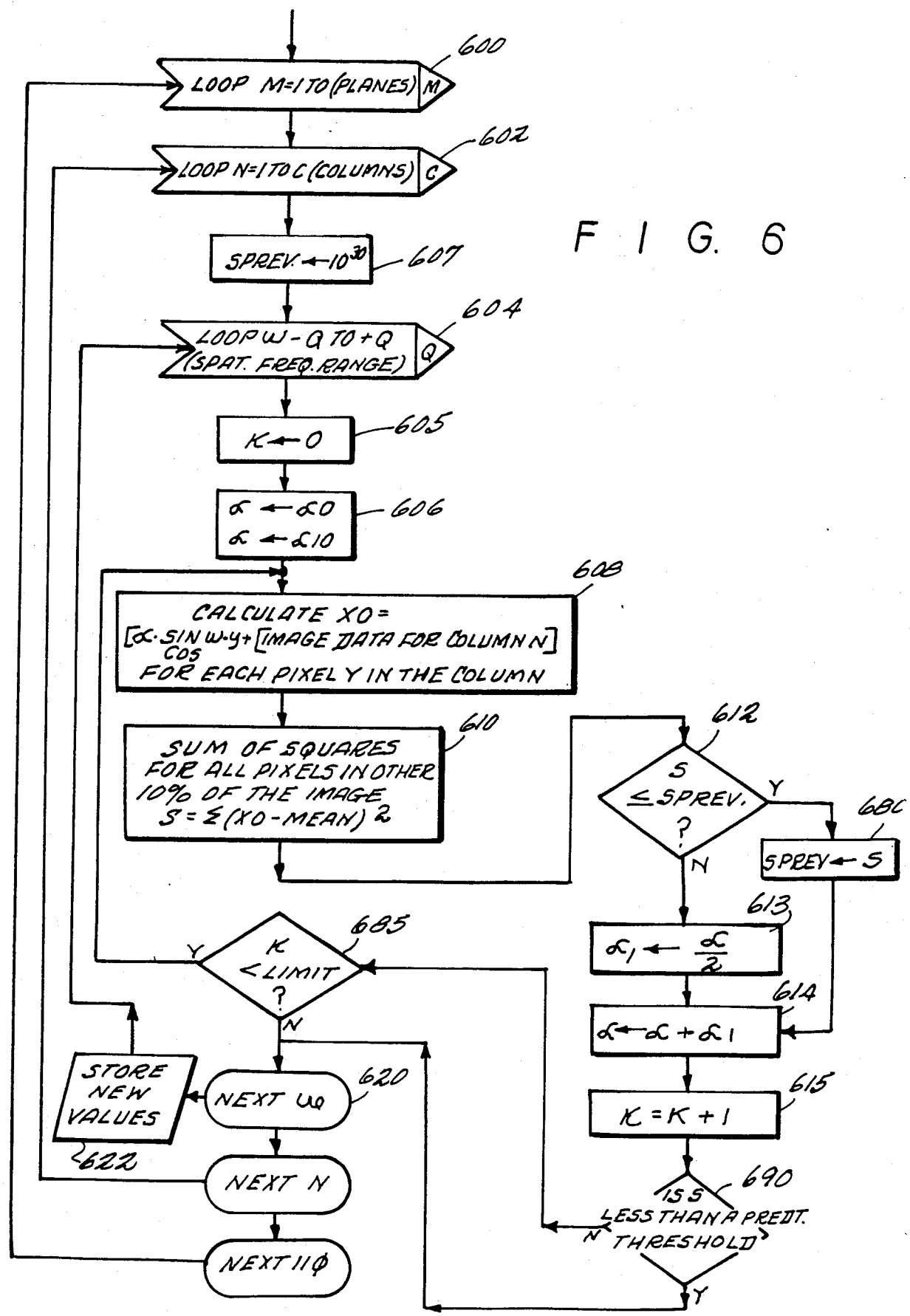
FIG. 6 shows a flowchart-type diagram of the iterative correction technique.

First among these techniques is the iterative correction of step 322, which is shown in FIG. 6. The iterative technique bases its operation on about 10% of the image which lies on either side of the patient in a location where the pixel values should all be zero. This area is then used to calculate what value of errant low spatial frequencies are present in the reconstructed matrix inversion tomosynthesis images. These values are then subtracted from the images to yield flat images in the 10% edge regions. This iterative correction technique works well for the very lowest spatial frequencies.

To conceptualize this correction, once matrix inversion tomosynthesis has been used to reconstruct the image, there will be some inaccurate low frequencies that cause problems in the image, owing to the poor conditioning of the low frequency matrices. These low frequencies will typically have a spatial frequency of 1 to 5 periods across the image. An area of each image outside the patient is used to determine when the best correction for low frequencies has been achieved. Varying amounts of low spatial frequency components are added to the image to flatten out this area outside the patient. Therefore, this system will be used to correct for a plurality of different spatial frequencies one by one, until the entire system zeros out. The correction procedure may iterate several times for improved accuracy.

The detailed software necessary to effect this operation is shown in FIG. 6. A first loop is formed from 1 to M at step 600, where M is the number of planes. Step 602 forms a loop from 1 to C, where C is the number of columns. A third nested loop is formed within the spatial frequency range of $-Q$ to $Q$ at step 604. The range of $-Q$ to $Q$ can be any desired frequency range, but will typically be the low frequency ranges below which correction is necessary (e.g., ~5 cycles per image width).

At step 605 a loop counter K is initialized. At step 606, a weighting constant $\alpha$ is set to its initial value of $\alpha_o$, and a weighting increment $\alpha_1$ is also initialized. Step 608 then calculates a weighted trigonometric function as $\alpha$ times the sine or cosine of $\omega y$ (where $\omega$ is the current spatial frequency value of loop 604 and y is the pixel number) and adds this to the image data for the current column N, where N is the current column number according to the loop of step 602. The result of the calculation at step 608 is then used by step 610 to form a sum of squares for all pixels in the outer 10% of the column on both sides of the patient.

A sum of square's S, is taken of the modified image in the two 10% edge regions. (The previous sum of squares value, $S_{pev}$, is initialized to a large number higher than any expected value in Step 607, prior to the loop over spatial frequencies).

The result of the sum of squares from step 610 is tested for comparison to its previous value at Step 612. If the sum of squares is greater than the previous value, control passes to the "no" side of the decision block of the of step 612 where $\alpha_1$ is modified to equal $\alpha_1/2$ at step 613, and then $\alpha$ is incremented by the amount $\alpha_1$ at step 614, by control passing to step 615 where the loop counter K is incremented. K is then tested against a predetermined limit at decision block 685. If K is less than the limit, control goes to decision block 690 where S is tested against on predetermined threshold. If S is not less than the threshold, the loop returns to step 608, where $x_o$ is recalculated using the new $\alpha$. That is, each image data for column N is again added to the new $\alpha$ times a sine or cosine of the particular frequency $\omega$. If the result of the test at Step 612 is positive, that is S is less than $S_{prev}$, $S_{prev}$ is set to S at Step 680. This is followed by an incrementing of $\alpha$ at Step 614 and an incrementing of K at Step 615. The tests of Steps 685 and 690 are then carried out as described above. This progressive weighting is continually carried out using different weighting factors $\alpha$ until the counter K exceeds its predetermined limit or S becomes less than its threshold, at which time the control passes to step 620 which increments the $\omega$ loop 604 and stores the new value for $\alpha$ at step 622. The next frequency in the loop is then used. The entire loop including steps 605–622 is then again executed for this new frequency to determine a new weighting factor $\alpha$. When the last frequency within the frequency range of loop 604 is reached, control passes to step 602, which chooses the next value in loop 602. In this way, all of the columns of loop 602 are repeatedly corrected for respective values of spatial frequency $\omega$.

All of the values for all of the columns for all of the planes are repeatedly corrected in an iterative fashion until all the sum of squares have been minimized. The low spatial frequency components are therefore corrected in this iterative fashion.

The final correction is the DC level correction shown in step 324 and explained in more detail with reference to FIG. 7. This DC level correction will prove necessary for good image reconstructions. The matrix equation cannot regenerate zero frequency at all, as a mathematical solution is not possible. Therefore, a solution for the DC value cannot be obtained by the matrix approach However, if the DC is not solved for, the DC value used will be different, and will be likely wrong, for all columns in the image. The present invention corrects this DC level in a similar way to the iterative correction. Specifically, the DC value is corrected by examining the image value at the edge of each image column. This value of the patient image should be zero, since there is nothing there. If this value is not zero, it will be forced to zero according to the DC correction technique, by adding a DC component thereto and to all other pixels in that image column. This technique is repeated for all columns in all planes.

The specific technique is shown in flowchart form in FIG. 7. First loop 700 is formed from 1 to M, where M is number of planes. A second nested loop from 1 to C, where C is the number of columns, is formed at step 702. Within the nested loop at step 704, the edge pixel at the top of each column is acquired. A determination is then made at step 706 if this edge pixel has a value equal to zero. If this determination is "yes", the loop continues to the next column. However, if the pixel is not equal to zero, the value of the pixel is negated, and this value is added to all pixels in the column at step 708. The new pixel values are stored at step 710, followed by the calculation for the next columns and planes.

A final correcting technique can be used as part of the display step 326 of FIG. 3. This final technique is shown in FIG. 8.

Specifically, a problem exists in that a trade off must be made between the number of planes which are obtained and the precision of the data which can be obtained from this technique. If there are too many planes, the matrices becomes poorly conditioned, and the data obtainable therefrom becomes degraded. It has been found by experiment that between 10 to 20 planes is the optimal limit. However, this yields relatively thick slices of the patient. If thinner slices are desired, these slices will be more poorly reconstructed.

Accordingly, an interleaving technique has been conceived by the inventors of the present invention in order to attempt to break this trade off. This is done specifically by obtaining data for a number $M_o$ of planes, for instance 10, at step 802. Thereafter, the same data is reprocessed by the matrix inversion tomosynthesis technique, using an offset value in the height of the reconstruction planes. This offset amount is set to a value equal to half the plane spacing for example. New data is then obtained using offset for a set of planes M1 at step 806. In this way, slices may be spaced more closely without the requirement of making too many planes, which could cause the matrices to be poorly conditioned. This technique uses the original data but reconstructs it as though it were in a different location. It should be noted that the various sets of images generated with the interleaving technique are not completely independent, but they may provide some improvement in interplane resolution. One skilled in the art will recognize that may sets of interleaved planes may be obtained in this fashion.

Finally, FIG. 9 will be used herewith to describe the steps necessary to obtain the inverse blurring matrix $\bar{F}^{-1}$.

FIG. 9 depicts the projected geometry for tomosynthetic imaging acquisition wherein there are five projections taken, for example, with x-ray tube 102 positioned at locations 960–968 and the imaging detector positioned at locations 970–978, respectively. Three planes 910, 912 and 914 are depicted, for sake of example, inside patient 100 which are to be reconstructed by matrix inversion tomosynthesis.

Consider the location of the object point 950 in the patient. As the tube/film combination moves, the projected image of the point appears at various locations on the film. In particular, at film location 970, the projected position of point 950 relative to the center of the film is given by a distance 920. Likewise, at film positions 972, 976 and 978 the projected positions of the point are at distances of 921, 922 and 923 respectively. The projected position at film location 974 is the center of the film in this example. If one were to add these five projection images together without any shifting, one could represent the location of the five projected positions of point 950 by the five delta functions 1941 shown in FIG. 9B, each of which is separated by a distance 1942.

If one repeats this same procedure for an object point in plane 914, for example, one might find a set of projected positions as given by delta functions 1943 of FIG. 9C. It is the distances, 942 and 1944, between the delta functions in these two examples that specify the amount of shift that is necessary to tomosynthesize planes 910 and 914 respectively. Hence, if one tomosynthesized plane 914 by shifting all the projection images by an amount 1944, then the locations of the projections of point 950 would be given by the delta functions 1945 of FIG. 9D. The spacing between delta functions 1945 is a distance 1946, which is equal to 1944 minus 1942. The set of delta functions 1945 represents the blurring function for structures in plane 910 when plane 914 is tomosynthesized. The Fourier transform of the string of delta functions is then taken to give one element of the matrix $\bar{F}$. All other elements in the matrix of blurring functions may be calculated in an equivalent manner.

Figure 10:
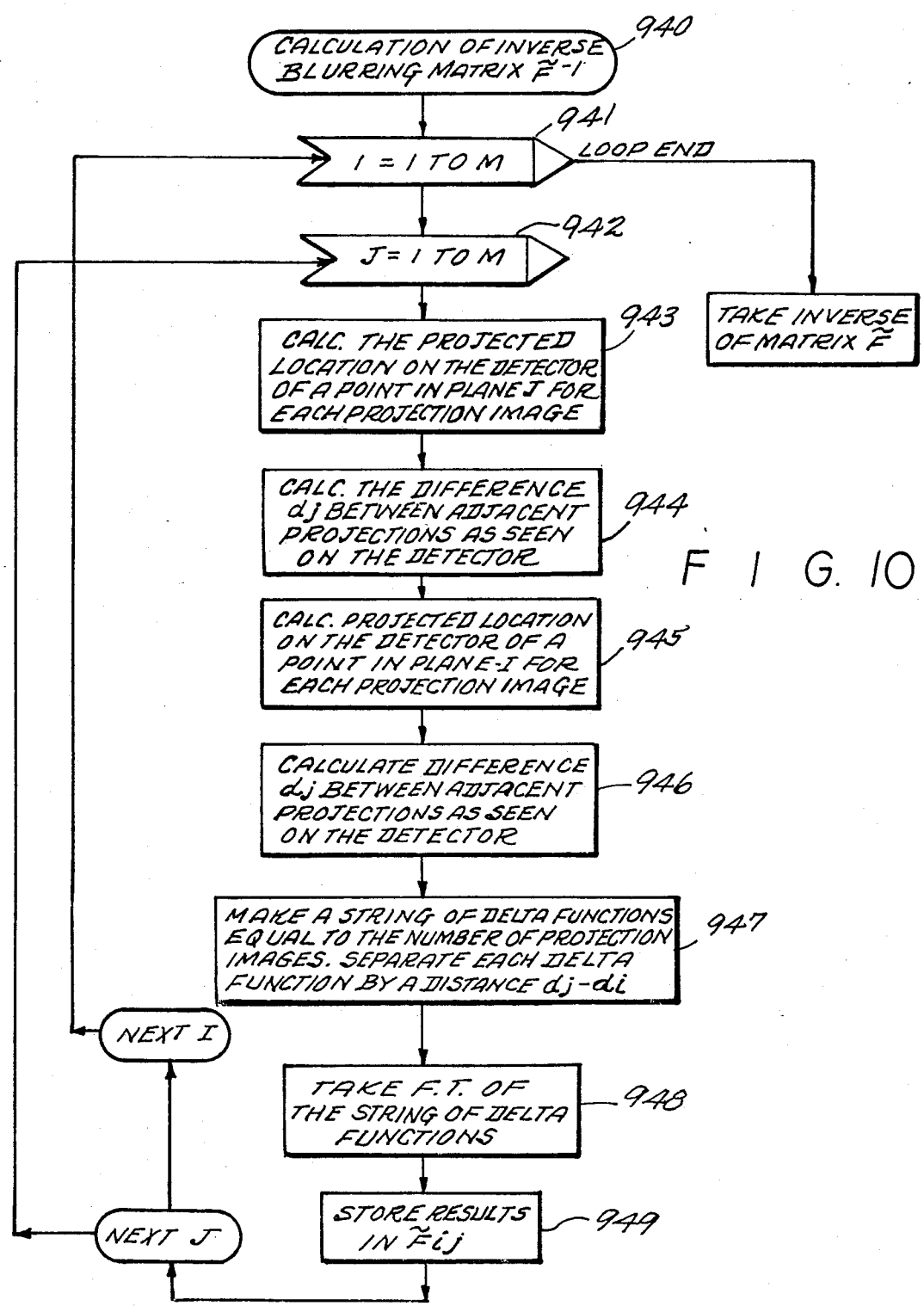
FIG. 10 shows a flowchart diagram of the technique for calculating the inverse blurring matrix.

The flowchart for the calculation of the inverse blurring matrix is shown in summary form in FIG. 10. Two nested loops, 941 and 942 are formed, each over the number of planes to reconstruct, M. Step 943 calculates the projected positions of an object in plane j for each projection image, in accordance with the diagram in FIG. 9. Then in Step 944 the difference between these projected points in the detected image is calculated for two adjacent projection images. Steps 945 and 946 repeat the procedure of Steps 943 and 944, except that now an object in plane i is considered. Step 947 takes the difference between the values calculated in Steps 944 and 946 and generates a string of delta functions with a spacing of $d_j - d_i$ between them. These delta functions represent the image replication, or blurring, found for structures in plane j when plane i is tomosynthesized. The Fourier transform of this string of delta functions is taken in Step 948 and is stored as $\bar{F}_{ij}$ in 949. Once both loops end, the inverse of the matrix F is found and control returns to Step 316.

To summarize, then, the present invention describes a technique of reconstructing longitudinal x-ray transmission images using an x-ray geometric tomography device to obtain the initial images. These initial images are then processed using digital tomosynthesis to generate tomographic images at various reconstruction plane heights. Matrix inversion mathematics can then be used to solve exactly for structures in the tomosynthesized reconstruction planes, allowing elimination of blurred artifacts from the other planes. Weighting factors or digital filtering can be used for the original projection images in order to tailor the appearance of between-plane structures in the final reconstructed planes. The determination of zero frequency components of the images are then made by subtracting an overall constant from each reconstructed line of each plane, in order to make the edge of each plane approach zero. This depends on the fact that outside of the patient the image should have a value of zero. The use of an iterative technique is also discussed in order to correct for errors in determining the lowest spatial frequency components in the reconstructed images. This iterative technique adds varying amounts of low spatial frequency components to each reconstructed image line until the region at the very edge of the film becomes flat. A hybrid technique is also discussed that improves calculation of those spatial frequency components. This hybrid technique substitutes low spatial frequencies from wide tomographic scan data into images reconstructed from a narrow tomographic scan. This narrow scan geometry provides better reconstruction of the structures between planes, but the wide scan data is less susceptible to problems resulting from image noise in the reconstruction of low spatial frequencies. Finally, a plurality of data from different reconstructions can be interleaved in order to simulate thin slices of structures within the patient's body.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A tomosynthesis apparatus, comprising:
   an x-ray tomography machine for producing a plurality of x-ray projection images of a subject including an x-ray source, and detection means; and
   processing means, connected to receive said plurality of projection images, for:
   (a) shifting and reconstructing said projection x-ray images to obtain a tomosynthesis matrix of images T;
   (b) acquiring a blurring matrix F having components which represent out-of-focus and in-focus components of said matrix T;
   (c) obtaining a matrix P representing only in-focus components of said imaged subject by solving a matrix equation including said matrix T and said matrix F;
   (d) correcting said matrix P for low spatial frequency components; and
   (e) displaying images indicative of contents of said matrix P.

2. An apparatus as in claim 1 wherein said processing means is also for correcting said images to improve reconstruction of between-plane structures.

3. An apparatus as in claim 1 wherein said processing means is also for weighting said projection images before said shifting and reconstructing, each said image being weighted in a way such that images obtained towards a ninety-degree orientation of said x-ray source and detection means are more heavily weighted than images obtained towards shallower angle orientation of said x-ray source and detection means.

4. An apparatus as in claim 3 wherein said processing means includes means for imaging an area outside said subject and correcting all of said image by an amount to cancel non-zero image components of said area outside said subject, to correct for said low spatial frequencies.

5. An apparatus as in claim 4 wherein said imaging means includes means for imaging an area outside said subject, means for determining a DC level in a predetermined area of said area outside of the subject, and means for adding a correction factor to said image to reduce said DC level to zero in said predetermined area.

6. An apparatus as in claim 5 wherein said imaging means includes means for iteratively determining low spatial frequency components of said area outside the subject, means for determining inverses of said low spatial frequency components, and means for adding said inverses to said image to zero out said low spatial frequency components in said area outside the subject.

7. An apparatus as in claim 6 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

8. An apparatus as in claim 7 wherein said x-ray tomography machine comprises:
   a patient table for receiving a patient;
   an x-ray source on one side of said patient; and
   means for receiving an x-ray image on the other side of said patient.

9. An apparatus as in claim 8 further comprising an array processor coupled to said processing means, for Fourier transforming said plurality of x-ray images and for solving said matrix equation, thereby accelerating said processing means.

10. An apparatus as in claim 1 wherein said processing means includes means for imaging an area outside said subject and correcting all of said image by an amount to cancel non-zero image components of said area outside said subject, to correct for said low spatial frequencies.

11. An apparatus as in claim 10 wherein said imaging means includes means for determining a DC level in a predetermined area of said area outside of the subject, and means for adding a correction factor to said image to reduce said DC level to zero in said predetermined area.

12. An apparatus as in claim 10 wherein said imaging means includes means for iteratively determining low spatial frequency components of said area outside the subject, means for determining inverses of said low spatial frequency components, and means for adding said inverses to said image to zero out said low spatial frequency components in said area outside the subject.

13. An apparatus as in claim 1 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

14. A tomosynthesis apparatus, comprising:
an x-ray tomography machine for producing a plurality of x-ray projection images of a subject including an x-ray source, and detection means; and
processing means, connected to receive said plurality of projection images, for:
(a) weighting each said projection image according to a position of each said image, such that images obtained toward a ninety degree orientation of said x-ray source and detection means are more heavily weighted than images obtained towards shallower angle orientations of said x-ray source and detection means;
(b) shifting and reconstructing said projection images to obtain a tomosynthesis matrix of images T;
(c) acquiring a blurring matrix F representing out-of-focus and in-focus components of said matrix T;
(d) obtaining a matrix P representing only in-focus components of said x-ray imaged subject by solving a matrix equation including said matrix T and said matrix F; and
(e) displaying images indicative of the contents of said matrix P.

15. An apparatus as in claim 14 wherein said processing means includes means for imaging an area outside said subject and correcting for non-zero components thereof.

16. An apparatus as in claim 15 further comprising:
means for analyzing an image area of a particular column of a particular image of said matrix P, said image area being one outside the subject;
means for determining a non-zero component of said image area and producing a correction value substantially equal to said non-zero component, but having a negative value compared therewith;
means for adding said correction value to said column to zero out said area outside said subject; and
means for controlling said analyzing means, said determining means and said adding means to operate for all of said columns in all of said images in said matrix P.

17. An apparatus as in claim 16 wherein said processing means further comprises:
means for imaging an area outside the subject;
means for iteratively determining a plurality of low spatial frequencies;
means for determining non-zero components of said area outside the subject respectively occurring at said plurality of low spatial frequencies; and
means for adding a value of each of said spatial frequencies to said image which cancels said low spatial frequencies in said area.

18. An apparatus as in claim 17 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

19. An apparatus as in claim 14 further comprising:
means for analyzing an image area of a particular column of a particular image of said matrix P, said image area being one outside the subject;
means for determining a non-zero component of said image area and producing a correction value substantially equal to said non-zero component, but having a negative value compared therewith;
means for adding said correction value to said column to zero out said area outside said subject; and
means for controlling said analyzing means, said determining means and said adding means to operate, for all of said columns in all of aid images in said matrix P.

20. An apparatus as in claim 14 wherein said processing means further comprises:
means for imaging an area outside the subject;
means for iteratively determining a plurality of low spatial frequencies;
means for determining non-zero components of said area outside the subject respectively occurring at said plurality of low spatial frequencies; and
means for adding a value of each of said spatial frequencies to said image which cancels said low spatial frequencies in said area.

21. An apparatus as in claim 20 wherein said processing means further comprises a column counter and a frequency counter for maintaining a count of respective columns and frequencies, respectively.

22. An apparatus as in claim 14 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

23. An apparatus as in claim 12 wherein said processing means is also for receiving said plurality of images and Fourier transforming said plurality of images.

24. An apparatus as in claim 14 wherein said processing means is also for:
(f) initiating an image counter which points to a specific image contained in said matrix P;
(g) initiating a frequency counter which maintains a spatial frequency value $\omega$;
(h) determining if areas outside said subject for said image represented by said image counter have a non-zero value at said frequency $\omega$;
(i) determining a value to cancel said non-zero value, and adding said value to said image of said subject;
(j) determining if said frequency value $\omega$ is below a limit;
(k) incrementing said frequency value $\omega$ if below said limit and repeating said functions (h)-(k) until above said limit;
(l) determining if said image counter is above a limit;
(m) incrementing said image counter if below said limit and repeating said functions (g)-(m) until said image counter is above said limit; and
(n) displaying images indicative of contents of said matrix P as corrected by said functions (f)-(m).

25. An apparatus as in claim 24 wherein said processing means includes means for imaging an area outside said subject and correcting all of said image by an amount to cancel non-zero image components of said area outside said subject, to correct for low spatial frequencies.

26. An apparatus as in claim 25 wherein said imaging means includes means for imaging an area outside said subject, means for determining a DC level in a predetermined area of said area outside of the subject, and means for adding a correction factor to said image to cancel out said DC level in said predetermined area.

27. An apparatus as in claim 26 wherein said imaging means includes means for iteratively determining non-zero components of said area outside the subject and adding a correction for specific spatial frequency components to zero out said non-zero areas.

28. An apparatus as in claim 27 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

29. An apparatus as in claim 28 wherein said x-ray tomography machine comprises a patient table for receiving a patient;
an x-ray source on one side of said patient; and
means for receiving an x-ray image on the other side of said patient.

30. An apparatus as in claim 29 wherein said imaging means further comprises:
a frequency counter for maintaining a count of a particular spatial frequency;
a column counter for maintaining a count of a particular image column;
means for analyzing an image area which is outside the subject for said particular image column to determine a value of said particular frequency;
means for adding a value of said frequency to said column in order to cancel out said particular frequency;
means for incrementing said frequency counter; and
means for incrementing said column counter.

31. A tomosynthesis apparatus, comprising:
an x-ray tomography machine for producing a plurality of x-ray projection images of a subject and of an area outside said subject including an x-ray source, and detection means; and
processing means, connected to receive said plurality of images, for:
(a) shifting and reconstructing said projection x-ray images to obtain a tomosynthesis matrix of images T;
(b) acquiring a blurring matrix F having components which represent out-of-focus and in-focus components of said matrix T;
(c) obtaining a matrix P representing only in-focus components of said x-ray imaged subject by solving a matrix equation including said matrix T and said matrix F;
(d) determining a DC level in at least a portion of said area outside of the subject;
(e) adding a correction factor to said image to substantially zero out said DC level in said predetermined area, to form a corrected matrix P; and
(f) displaying images indicative of contents of said corrected matrix P.

32. An apparatus as in claim 31 wherein said processing means is also for weighting said projection images before shifting and correcting, each image being weighted in a way such that images obtained towards a ninety-degree orientation of said x-ray source and detection means are weighted higher than images obtained towards shallower angle orientation on said x-ray source and detection means.

33. An apparatus as in claim 32 wherein said processing means includes means for iteratively determining non-zero components of said area outside the subject and adding a correction for specific spatial frequency components to zero out said non-zero areas.

34. An apparatus as in claim 33 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

35. An apparatus as in claim 34 wherein said processing means comprises:
means for analyzing an image area outside the subject for a particular column in a particular image;
means for determining a non-zero DC component of said column; and
means for adding values to each of said columns in said images which zeros out said area outside said subject.

36. An apparatus as in claim 31 wherein said processing means includes means for iteratively determining non-zero components of said area outside the subject and adding a correction for specific spatial frequency components to zero out said non-zero areas.

37. An apparatus as in claim 31 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

38. An apparatus as in claim 31 wherein said processing means comprises:
means for analyzing an image area outside the subject for a particular column in a particular image;
means for determining a non-zero DC component of said column; and
means for adding values to each of said columns in said images which zero out said area outside said subject.

39. An apparatus as in claim 31 wherein said imaging means further comprises: a frequency counter for maintaining a count of a particular spatial frequency:
a column counter for maintaining a count of a particular image column;
means for analyzing an image area outside the subject for said particular column to determine a value of said particular frequency;
means for adding a value of said frequency to said column which zeros out said particular frequency;
means for incrementing said frequency counter; and
means for incrementing said column counter.

40. A tomosynthesis apparatus, comprising:
an x-ray tomography machine including an x-ray source, and detection means for producing a plurality of x-ray images of a subject including data from a wide scan of said x-ray source and data from a narrow scan of an x-ray source; and
processing means, connected to receive said plurality of images, for;
(a) Fourier transforming said plurality of x-ray images;
(b) shifting and reconstructing said x-ray images to obtain tomosynthesis matrices of images $T_N$ and $\tilde{T}_W$ representing said narrow and wide swings of said x-ray tube respectively;
(c) acquiring blurring matrices $\tilde{F}_N$ and $\tilde{F}_W$ having components which represent out-of-focus and in-focus components of said matrices $\tilde{T}_N$ and $\tilde{T}_W$ respectively;

(d) multiplying said matrices $\tilde{T}_N$ and $\tilde{T}_W$ by inverses of said matrices $\tilde{F}_N$ and $\tilde{F}_W$ respectively, to obtain matrices $\tilde{P}N$ and $\tilde{P}W$ respectively, each representing only in-focus components of said x-ray imaged subject;

(e) replacing low spatial frequencies in said matrix $\tilde{P}_N$ with low spatial frequencies from said matrix $\tilde{P}_W$ to obtain a matrix $\tilde{P}$;

(f) inverse Fourier transforming said matrix $\tilde{P}$ to obtain a matrix $\bar{P}$; and (g) displaying images indicative of contents of said matrix P.

41. An apparatus as in claim 40 wherein said processing means is also for weighting said projection images before shifting and correcting, each image being weighted in a way such that images obtained towards a ninety-degree orientation of said x-ray source and detection means are weighted heavier than images obtained towards shallower angle orientation of said x-ray source and detection means.

42. An apparatus as in claim 41 wherein said correcting means is also for imaging an area outside said subject and correcting for non-zero spatial frequency components of said area outside said subject.

43. An apparatus as in claim 42 wherein said processing means further includes means for imaging an area outside said subject, means for determining a DC level in a predetermined area outside of said subject, and means for adding a correction factor to said image to zero out said DC level in said predetermined area.

44. An apparatus as in claim 43 wherein said processing means includes means for iteratively determining non-zero spatial frequency components of said area outside the subject and adding a correction to said image to zero out said non-zero areas.

45. An apparatus as in claim 44 wherein said processing means includes an array processor for Fourier transforming said images and for performing matrix operations.

46. An apparatus as in claim 45 wherein said imaging means further comprises:

a frequency counter for maintaining a count of a particular image column;

a column counter for maintaining a count of a particular image column;

means for analyzing an image area which is outside the subject for said particular column to determine a value of said particular frequency;

means for adding a value of said spatial frequency to said column in said image which cancels out said particular frequency in said area outside the subject;

means for incrementing said frequency counter; and
means for incrementing said column counter.

47. An apparatus as in claim 40 wherein said processing means is also for imaging an area outside said subject and correcting for non-zero spatial frequency components of said area outside said subject.

48. An apparatus as in claim 47 wherein said processing means further includes means for determining a DC level in a predetermined area outside of said subject, and means for adding a correction factor to said image to zero out said DC level in said predetermined area.

49. An apparatus as in claim 47 wherein said processing means includes means for iteratively determining non-zero spatial frequency components of said area outside the subject and adding a correction to said image to zero out said non-zero areas.

50. An apparatus as in claim 40 wherein said processing means includes an array processor for Fourier transforming said images and for performing said matrix operations.

51. An apparatus as in claim 40 wherein said imaging means further comprises:

a frequency counter for maintaining a count of a particular frequency;

a column counter for maintaining a count of a particular image column;

means for analyzing an image area which is outside the subject for said particular column to determine a value of said particular frequency;

means for adding a value of said spatial frequency to said column in said image which conceals out said particular frequency in said area outside the subject;

means for incrementing said frequency counter; and
means for incrementing said column counter.

52. A tomosynthesis apparatus, comprising:

an x-ray tomography machine for producing a plurality of x-ray projection images of a subject and of areas outside said subject including an x-ray source, and detection means; and processing means, connected to receive said plurality of images, for:

(a) shifting and reconstructing said x-ray images to obtain a tomosynthesis matrix of images T;

(b) acquiring a blurring matrix F having components which represent out-of-focus and in-focus components of said matrix T;

(c) obtaining a matrix P representing only in-focus components of said x-ray imaged subject by solving a matrix equation including said matrix T and said matrix F;

(d) initiating an image counter which points to a specific image in said matrix P;

(e) initiating a frequency counter which maintains a spatial frequency value $\omega$;

(f) determining if said areas outside said subject at said image of said image counter have a non-zero value at said spatial frequency $\omega$;

(g) determining a value of said spatial frequency $\omega$ to cancel said non-zero value, and adding said value to said image of said subject;

(h) determining if said frequency value $\omega$ is below a limit;

(i) incrementing said frequency value $\omega$ if below said limit and repeating said functions (f), (g), (h) and (i) until above said limit;

(j) determining if said image counter is above a limit;

(k) incrementing said image counter if below said limit and repeating said functions (e)-(k) until said image counter is above said limit; and (l) displaying images indicative of contents of said matrix P as corrected by said functions (d)-(k).

53. An apparatus as in claim 52 wherein said processing means is also for weighting said projection images before shifting and correcting, each image being weighted in a way such that images obtained towards a ninety-degree orientation of said x-ray source and detection means are weighted higher than images obtained towards shallower angle orientation of said x-ray source and detection means.

54. An apparatus as in claim 53 wherein said processing means is also for imaging an area outside said subject, determining a DC level in a predetermined area outside of the subject, and for adding a correction factor to said image to zero out said DC level of said predetermined area.

55. An apparatus as in claim 54 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

56. An apparatus as in claim 55 wherein said x-ray tomography machine comprises a patient table for receiving a patient;
an x-ray source on one side of said patient; and
means for receiving an x-ray image on the other side of said patient.

57. An apparatus as in claim 52 wherein said processing means is also for determining a DC level in a predetermined area outside of the subject, and for adding a correction factor to said image to zero out said DC level of said predetermined area.

58. An apparatus as in claim 52 wherein said tomography machine includes means for producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

59. A tomosynthesis apparatus, comprising:
an x-ray tomography machine for producing a plurality of x-ray images of a subject and of areas outside said subject; and
processing means, connected to receive said plurality of x-ray images of a subject and of areas outside said subject; and
processing means, connected to receive said plurality of images, for:
(a) Fourier transforming said plurality of x-ray images;
(b) shifting and reconstructing said x-ray images to obtain tomosynthesis matrices of images $\tilde{T}_N$ and $\tilde{T}_W$ representing narrow and wide swings of said x-ray tube respectively;
(c) acquiring blurring matrices $\tilde{F}_N$ and $\tilde{F}_W$ having components which represent out-of-focus and in-focus components of said matrices $\tilde{T}_N$ and $\tilde{T}_W$;
(d) multiplying said matrices $\tilde{T}_N$ and $\tilde{T}_W$ by inverses of said matrices $\tilde{F}_N$ and $\tilde{F}_W$ respectively to obtain matrices $\tilde{P}_N$ and $\tilde{P}_W$ respectively, each representing only in-focus components of said x-ray imaged subject;
(e) replacing low spatial frequencies in said matrix $\tilde{P}_N$ with low spatial frequencies from said matrix $\tilde{P}_W$ to obtain a matrix $\tilde{P}$;
(f) inverse Fourier transforming said matrix $\tilde{P}$ to obtain a matrix P;
(g) initiating an image counter which points to a specific image of said matrix P;
(h) initiating a frequency counter which maintains a spatial frequency value $\omega$;
(i) determining if said areas outside said subject at said image of said image counter have a non-zero value at said frequency $\omega$;
(j) determining a value of said spatial frequency to cancel said non-zero value, and adding said value to said image of said subject;

(k) determining if said frequency value $\omega$ is below said limit and repeating said functions (f), (g), (h) and (i) until above said limit;
(l) incrementing said frequency value $\omega$ if below said limit and repeating said functions (f), (g), (h) and (i) until above said limit;
(m) determining if said image counter is above a limit;
(n) incrementing said image counter if below said limit and repeating said functions (e)–(k) until said image counter is above said limit; and
(o) determining a DC level in at least a portion of said area outside of the subject;
(p) adding a correction factor to said image to substantially zero out said DC level in said portion; and
(q) displaying images indicative of contents of a corrected matrix P.

60. A method of matrix-inversion tomosynthesis correction, comprising the steps of:
(a) producing a plurality of x-ray images of a subject and images of an area outside said subject;
(b) shifting and reconstructing said x-ray images for tomosynthesis to obtain a matrix of images T;
(c) acquiring a blurring matrix F having components which represent out-of-focus and in-focus components of said matrix T;
(d) obtaining a matrix P representing only in-focus components of said x-ray imaged subject by solving a matrix equation including said matrix T and said matrix F;
(e) determining a non-zero value of at least a portion of said area outside the subject;
(f) adding a value to said image to cancel said non-zero value; and
(g) displaying images indicative of contents of said matrix P as corrected in steps (e) and (f).

61. A method as in claim 60 comprising the further step of weighting said images before shifting and correcting, each plane being weighted in a way such that images obtained toward a ninety degree orientation of said x-ray source and detection means are more heavily weighted than images obtained towards shallower angle orientations of said x-ray source and detection means.

62. A method as in claim 61 comprising the further steps of iteratively determining non-zero components of said area outside the subject and adding a correction for specified spatial frequency components to zero out said non-zero areas.

63. A method as in claim 60 comprising the further steps of iteratively determining non-zero components of said area outside the subject and adding a correction for specific spatial frequency components to zero out said non-zero areas.

64. A method as in claim 60 comprising the further steps of producing data from a wide scan of an x-ray source and data from a narrow scan of an x-ray source, and wherein said processing means is also for replacing low spatial frequencies from said narrow scan of said x-ray source with low spatial frequencies from said wide scan of said x-ray source.

65. A method of matrix-inversion tomosynthesis correction, comprising the steps of:
producing a plurality of x-ray projection images of a subject;
weighting each said projection image according to a position of each said image, such that images obtained toward a ninety degree orientation of an x-ray source and detection means are more heavily weighted than images obtained towards shallower angle orientations of said x-ray source and detection means;

shifting and reconstructing said projection images to obtain a tomosynthesis matrix of images T;

acquiring a blurring matrix F representing out-of-focus and in-focus components of said matrix T;

obtaining a matrix P representing only in-focus components of said x-ray imaged subject by solving a matrix equation including said matrix T and said matrix F; and displaying images indicative of the contents of said matrix P.

66. A method as in claim 65 comprising the further step of imaging an area outside said subject and correcting for non-zero components thereof.

67. A method as in claim 66 comprising the further steps of:

analyzing an image area of a particular column of a particular image of said matrix P, said image area being one outside the subject;

determining a non-zero component of said image area and producing a correction value substantially equal to said non-zero component, but having a negative value compared therewith;

adding said correction value to said column to zero out said area outside said subject; and controlling said analyzing step, said determining step and said adding step to operate for all of said columns in all of said images in said matrix P.

68. A method as in claim 67 comprising the further steps of:

imaging an area outside the subject;

iteratively determining a plurality of low spatial frequencies;

determining non-zero components of said area outside the subject respectively occurring at said plurality of low spatial frequencies; and adding a value of each of said spatial frequencies to said image which cancels said low spatial frequencies in said area.

69. A method as in claim 68 comprising the further steps of:

producing data from a wide scan of an x-ray source and data from a narrow scan of an x-ray source, and replacing low spatial frequencies from said narrow scan of said x-ray source with low spatial frequencies from said wide scan of said x-ray source.

70. A method as in claim 65 comprising the further steps of:

analyzing an image area of a particular column of a particular image of said matrix P, said image area being one outside the subject;

determining a non-zero component of said image area and producing a correction value substantially equal to said non-zero component, but having a negative value compared therewith;

adding said correction value to said column to zero out said area outside said subject; and controlling said analyzing step, said determining step and said adding step to operate for all of said columns in all of said images in said matrix P.

71. A method as in claim 65 comprising the further steps of:

imaging an area outside the subject;

iteratively determining a plurality of low spatial frequencies;

determining non-zero components of said area outside the subject respectively occurring at said plurality of low spatial frequencies; and adding a value of each of said spatial frequencies to said image which cancels said low spatial frequencies in said area.

72. A method as in claim 71 comprising the further step of:

maintaining a count of respective columns and frequencies, respectively.

73. A method as in claim 65 comprising the steps of:

producing data from a wide scan of an x-ray source and data from a narrow scan of an x-ray source, and replacing low spatial frequencies from said narrow scan of said x-ray source with low spatial frequencies from said wide scan of said x-ray source.

74. A method as in claim 65 comprising the further steps of:

(a) initiating an image counter which points to a specific image contained in said matrix P;

(b) initiating a frequency counter which maintains a spatial frequency value $\omega$;

(c) determining if areas outside said subject for said image represented by said image counter have a non-zero value at said frequency $\omega$;

(d) determining a value to cancel said non-zero value, and adding said value to said image of said subject;

(e) determining if said frequency value $\omega$ is below a limit;

(f) incrementing said frequency value $\omega$ if below said limit and repeating said steps (c)–(f) until above said limit;

(g) determining if said image counter is above a limit;

(h) incrementing said image counter if below said limit and repeating said steps (b)–(h) until said image counter is above said limit; and (i) displaying images indicative of contents of said matrix P as corrected.

75. A method as in claim 65 comprising the further steps of:

maintaining a count of a particular spatial frequency;

maintaining a count of a particular image column;

analyzing an image area which is outside the subject for said particular image column to determine a value of said particular frequency;

adding a value of said frequency to said column in order to cancel out said particular frequency;

incrementing said frequency counter; and incrementing said column counter.

76. A method of matrix-inversion tomosynthesis correction, comprising the steps of:

producing a plurality of x-ray projection images of a subject and of an area outside said subject;

shifting and reconstructing said projection x-ray images to obtain a tomosynthesis matrix of images T;

acquiring a blurring matrix F having components which represent out-of-focus and in-focus components of said matrix T;

obtaining a matrix P representing only in-focus components of said x-ray imaged subject by solving a matrix equation including said matrix T and said matrix F;

determining a DC level in at least a portion of said area outside of the subject;

adding a correction factor to said image to substantially zero out said DC level in said predetermined area, to form a corrected matrix P; and displaying images indicative of contents of said corrected matrix P.

77. A method as in claim 76 comprising the further step of:
weighting said projection images before shifting and correcting, each image being weighted in a way such that images obtained towards a ninety-degree orientation of an x-ray source and detection means are weighted higher than images obtained towards shallower angle orientations of said x-ray source and detection means.

78. A method as in claim 77 comprising the further step of:
iteratively determining non-zero components of said area outside the subject and adding a correction for specific spatial frequency components to zero out said non-zero areas.

79. A method as in claim 78 comprising the further steps of:
producing data from a wide scan of an x-ray source and data from a narrow scan of an x-ray source, and
replacing low spatial frequencies from said narrow scan of said x-ray source with low spatial frequencies from said wide scan of said x-ray source.

80. A method as in claim 79 comprising the further steps of:
analyzing an image area outside the subject for a particular column in a particular image;
determining a non-zero DC component of said column; and
adding values to each of said columns in said images which zero out said area outside said subject.

81. A method as in claim 76 comprising the further step of:
iteratively determining non-zero components of said area outside the subject and adding a correction for specific spatial frequency components to zero out said non-zero areas.

82. A method as in claim 76 comprising the further step of:
producing data from a wide scan of an x-ray source and data from a narrow scan of an x-ray source, and replacing low spatial frequencies from said narrow scan of said x-ray source with low spatial frequencies from said wide scan of said x-ray source.

83. A method as in claim 76 comprising the further steps of:
analyzing an image area outside the subject for a particular column in a particular image;
determining a non-zero DC component of said column; and
adding values to each of said columns in said images which zero out said area outside said subject.

84. A method as in claim 76 comprising the further steps of:
maintaining a count of a particular spatial frequency;
maintaining a count of a particular image column;
analyzing an image area outside the subject for said particular column to determine a value of said particular frequency;
adding a value of said frequency to said column which zeros out said particular frequency;
incrementing said frequency counter; and
incrementing said column counter.

85. A method of matrix-inversion tomosynthesis correction, comprising the steps of:
producing a plurality of x-ray images of a subject including data from a wide scan of said x-ray source and data from a narrow scan of an x-ray source;
Fourier transforming said plurality of x-ray images;
shifting and reconstructing said x-ray images to obtain tomosynthesis matrices of images $\widetilde{T}_N$ and $\widetilde{T}_W$ representing said narrow and wide scans of said x-ray tube respectively;
acquiring blurring matrices $\widetilde{F}_N$ and $\widetilde{F}_W$ having components which represent out-of focus and in-focus components of said matrices $\widetilde{T}_N$ and $\widetilde{T}_W$ respectively;
multiplying said matrices $\widetilde{T}_N$ and $\widetilde{T}_W$ by inverses of said matrices $\widetilde{F}_N$ and $\widetilde{F}_W$ respectively, to obtain matrices $\widetilde{P}_N$ and $\widetilde{P}_W$ respectively, each representing only in-focus components of said x-ray imaged subject;
replacing low spatial frequencies in said matrix $\widetilde{P}_N$ with low spatial frequencies from said matrix $\widetilde{P}_W$ to obtain a matrix $\widetilde{P}$;
inverse Fourier transforming said matrix $\widetilde{P}$ to obtain a matrix P; and
displaying images indicative of contents of said matrix P.

86. A method as in claim 85 comprising the further steps of weighting said projection images before shifting and correcting, each image being weighted in a way such that images obtained towards a ninety-degree orientation of said x-ray source and detection means are weighted heavier than images obtained towards shallower angle orientations of said x-ray source and detection means.

87. A method as in claim 86 comprising the further steps of imaging an area outside said subject and correcting for non-zero spatial frequency components of said area outside said subject.

88. A method as in claim 87 comprising the further steps of imaging an area outside said subject, determining a DC level in a predetermined area outside of said subject, adding a correction factor to said image to zero out said DC level in said image to zero out said DC level in said predetermined area.

89. A method as in claim 88 comprising the further steps of iteratively determining non-zero spatial frequency components of said area outside the subject and adding a correction to said image to zero out said non-zero areas.

90. A method as in claim 85 comprising the further steps of imaging an area outside said subject and correcting for non-zero spatial frequency components of said area outside said subject.

91. A method as in claim 90 comprising the further steps of determining a DC level in a predetermined area outside of said subject, and adding a correction factor to said image to zero said DC level in said predetermined area.

92. A method as in claim 90 comprising the further steps of iteratively determining non-zero spatial frequency component of said area outside the subject and adding a correction to said image to zero out said non-zero areas.

93. A method of matrix-inversion correction comprising the steps of:
(a) producing a plurality of x-ray projection images of a subject and of areas outside said subject including an x-ray source, and detection means;

(b) shifting and reconstructing said x-ray images to obtain a tomosynthesis matrix of images T;
(c) acquiring a blurring matrix F having components which represent out-of-focus and in-focus components of said matrix T;
(d) obtaining a matrix P representing only in-focus components of said x-ray imaged subject by solving a matrix equation including said matrix T and said matrix F;
(e) initiating an image counter which points to a specific image in said matrix P;
(f) initiating a frequency counter which maintains a spatial frequency value $\omega$;
(g) determining if said areas outside said subject at said image of said image counter have a non-zero value at said spatial frequency $\omega$;
(i) determining a value of said spatial frequency $\omega$ to cancel said non-zero value, and adding said value to said image of said subject;
(j) determining if said frequency value $\omega$ is below a limit;
(k) incrementing said frequency value $\omega$ if below said limit and repeating said steps (g)–(k) until above said limit;
(l) determining if said image counter is above a limit;
(m) incrementing said image counter if below said limit and repeating said steps (f)–(m) until said image counter is above said limit; and
(n) displaying images indicative of contents of said matrix P as corrected by said steps (e)–(m).

94. A method of matrix-inversion tomosynthesis correction, comprising the steps of:
(a) producing a plurality of x-ray images of a subject and of areas outside said subject;
(b) Fourier transforming said plurality of x-ray images;
(c) shifting and reconstructing said x-ray images to obtain tomosynthesis matrices of images $\tilde{T}_N$ and $\tilde{T}_W$ representing narrow and wide swings of said x-ray tube respectively;
(d) acquiring blurring matrices $\tilde{F}_N$ and $\tilde{F}_W$ having components which represent out-of-focus and in-focus components of said matrices $\tilde{T}_N$ and $\tilde{T}_W$;
(e) multiplying said matrices $\tilde{T}_N$ and $\tilde{T}_W$ by inverses of said matrices $\tilde{F}_N$ and $\tilde{F}_W$ respectively to obtain matrices $\tilde{P}_N$ and $\tilde{P}_W$ respectively, each representing only in-focus components of said x-ray imaged subject;
(f) replacing low spatial frequencies in said matrix $\tilde{P}_N$ with low spatial frequencies from said matrix $\tilde{P}_W$ to obtain a matrix $\tilde{P}$;
(g) inverse Fourier transforming said matrix $\tilde{P}$ to obtain a matrix P;
(g) initiating an image counter which points to a specific image of said matrix P;
(h) initiating a frequency counter which maintains a spatial frequency value $\omega$;
(i) determining if said areas outside said subject at said image of said image counter have a non-zero value at said frequency $\omega$;
(j) determining a value of said spatial frequency to cancel said non-zero value, and adding said value to said image of said subject;
(k) determining if said frequency value $\omega$ is below a limit;
(l) incrementing said frequency value $\omega$ if below said limit and repeating said steps (i)–(l) until above said limit;
(m) determining if said image counter is above a limit;
(n) incrementing said image counter if below said limit and repeating said steps (h)–n) until said image counter is above said limit; and
(o) determining a DC level in at least a portion of said area outside of the subject;
(p) adding a correction factor to said image to substantially zero out said DC level in said portion; and
(q) displaying images indicative of contents of a corrected matrix P.

* * * * *